United States Patent
Kawarai et al.

(10) Patent No.: US 6,771,600 B2
(45) Date of Patent: Aug. 3, 2004

(54) PACKET INSERTION INTERVAL CONTROL SYSTEM AND PACKET INSERTION INTERVAL CONTROL METHOD

(75) Inventors: Kenichi Kawarai, Kawasaki (JP); Takeshi Terada, Yokohama (JP); Yasutaka Ohno, Yokohama (JP); Yasuhiro Ooba, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 800 days.

(21) Appl. No.: 09/759,102

(22) Filed: Jan. 12, 2001

(65) Prior Publication Data

US 2001/0015957 A1 Aug. 23, 2001

(30) Foreign Application Priority Data

Feb. 23, 2000 (JP) ........................................ 2000-046451

(51) Int. Cl.[7] .............................................. H04L 12/28
(52) U.S. Cl. ...................................... 370/230; 370/674
(58) Field of Search ................................ 370/230, 249, 370/354, 474

(56) References Cited

U.S. PATENT DOCUMENTS 4,486,877 A * 12/1984 Turner ........................ 370/249
4,962,497 A * 10/1990 Ferenc et al. ............... 370/354

FOREIGN PATENT DOCUMENTS

JP 09107362 4/1997

* cited by examiner

*Primary Examiner*—Salvatore Cangialosi
(74) *Attorney, Agent, or Firm*—Katten Muchin Zavis Rosenman

(57) ABSTRACT

A packet insertion interval control system includes a counting unit (32), having a first bit field for managing an insertion interval of a management packet required to be cyclically inserted and a second bit field for specifying a logic path for forwarding the management packet, for executing such a counting operation as to periodically cycle the first bit field and the second bit field, and a control unit (31) for executing control for specifying, when a count value indicated by the first bit field of the counting unit is a predetermined value, the logic path for forwarding the management packet on the basis of a count value indicated by the second bit field of the counting unit, and for inserting the management packet into the specified logic path. With this architecture, it is feasible to restrain an increase in quantity of the hardware and flexibly correspond to changes in the number of connections (number of channels) and the cell insertion interval (packet insertion interval) per communication system.

30 Claims, 29 Drawing Sheets

FIG. 18
WHEN DEFINING CELL INSERTION INTERVAL BY SETTING DENOMINATOR TO 1440000
$1440000 = 2^7 \times 3^2 \times 5^3$
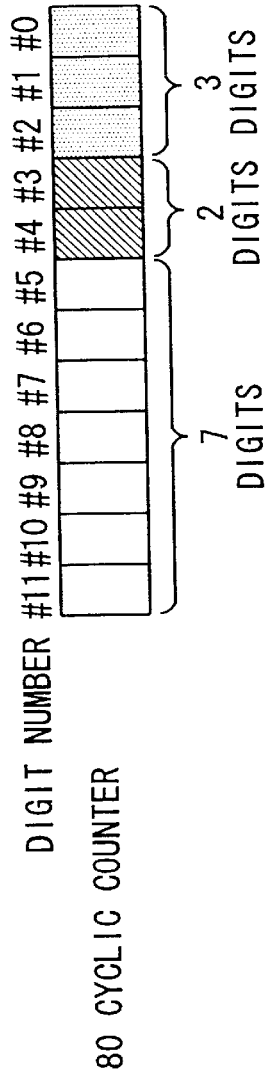
DIGIT NUMBER #11 #10 #9 #8 #7 #6 #5 #4 #3 #2 #1 #0
7 DIGITS | 2 DIGITS | 3 DIGITS
80 CYCLIC COUNTER
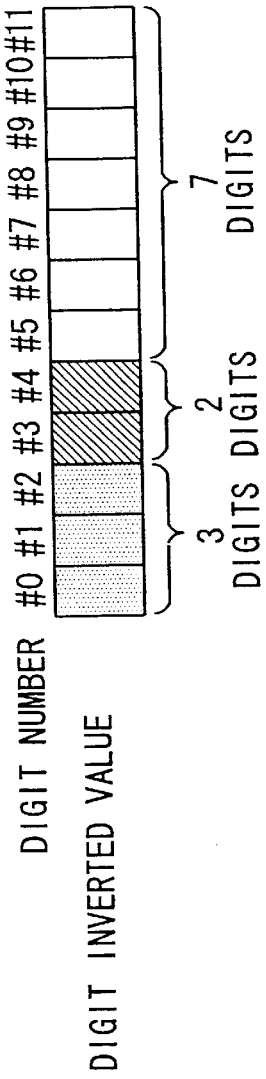
DIGIT NUMBER #0 #1 #2 #3 #4 #5 #6 #7 #8 #9 #10 #11
3 DIGITS | 2 DIGITS | 7 DIGITS
DIGIT INVERTED VALUE
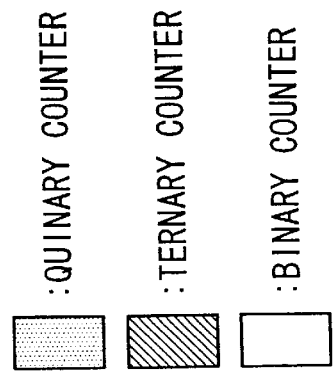
: QUINARY COUNTER
: TERNARY COUNTER
: BINARY COUNTER

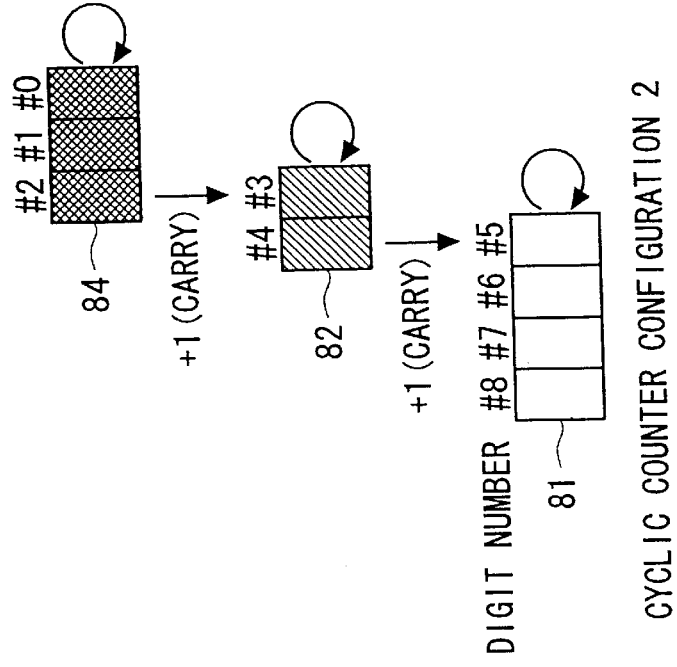
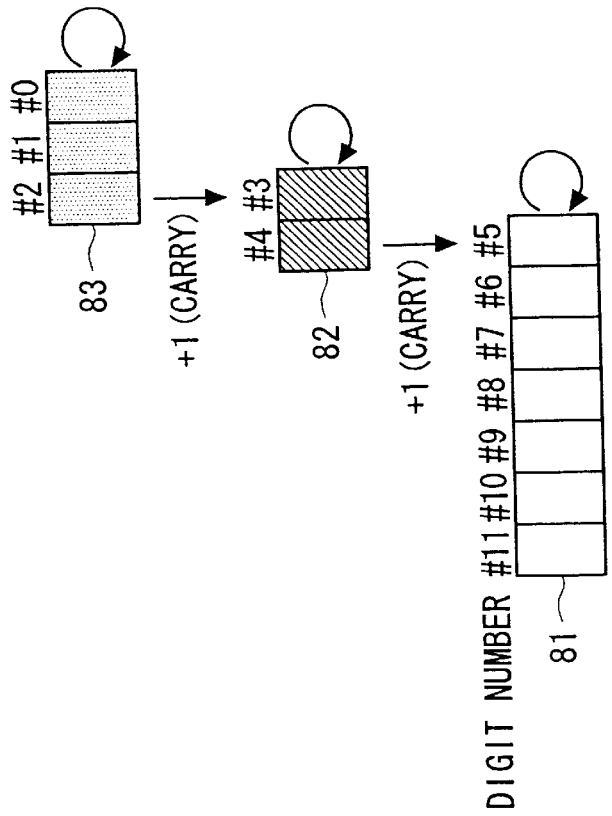
FIG. 19

FIG. 20

UNUSED CONNECTION MANAGEMENT TREE

PACKET INSERTION INTERVAL CONTROL SYSTEM AND PACKET INSERTION INTERVAL CONTROL METHOD

BACKGROUND OF THE INVENTION

The present invention relates generally to a packet switch system, applied to a broadband switch, a cross-connect switch, a router etc, for forwarding (that includes switching, transmitting and transferring, unless specifically limited) a packet for managing a communication system together with a user packet.

The present invention relates more particularly to a packet insertion interval control system and a packet insertion interval control method for controlling an insertion interval of management-oriented packets required to be periodically forwarded in order to manage an operation and maintenance of the communication system, and of packets previously accumulated.

An ATM (Asynchronous Transfer Mode) communication system, which is applied to a broadband switch and serves as a packet switch system for forwarding a fixed-length packet (cells), is required to, when transferring cell data of a user cell and an OAM (Operation And Maintenance) cell that are defined as basic data in ATM communications, keep a desired communication quality by controlling a transfer sequence of the cell data.

It is recommended that the OAM cells such as an AIS (Alarm Indication Signal) cell, an RDI (Remote Defect Indication) cell and a CC (Continuity Check) cell be transferred at a given cycle (a cycle of 1 sec according to ITU-T I.610) in order to notify of fault information when a fault occurs and to monitor a normality of connections (a VPC connection and a VC connection multiplexed with the physical layer connection) at all times.

In the ATM communication system for processing a plurality of connections by multiplexing these connections, when generating the cells of each connection at the cycle of 1 sec, if the cells are consecutively inserted into all the connections accommodated therein, a traffic falls into a burst, and consequently the cells are discarded due to an overflow of the cells from a cell buffer (memory) in a cell multiplexer provided at a rear stage. There exists a method of troubleshooting this problem by increasing a buffer capacity, however, this method brings about a scale-up of the hardware. While on the other hand, if the buffer capacity is not increased, a probability of occurrence of discarding the cells increases, resulting in a decline of the communication quality.

Accordingly, the conventional ATM communication system is specially provided with an insertion interval management counter of alarm cells such as the AIS cells, whereby an insertion interval of the alarm cells generated per connection is kept over a predetermined interval, and the alarm cells are controlled so that the alarm cells inserted are not sent in burst (refer to, e.g., Japanese Patent Application Laying-Open Publication Hei 9-107362).

Herein, this type of ATM communication system in the prior art will be explained referring to FIG. 1. In this ATM communication system, valid data [1] or invalid data [0] of connections ID#0, ID#1, ID#2, . . . ID#n defined as logic paths of the cells, are set beforehand in a connection management table 10. It is assumed that the connection numbers (ID#0, . . . ID#n) and address show one-to-one in the connection management table 10. A table access management unit 11, with a trigger that a notification of expiration of a counter value is inputted from an insertion interval management counter 12 at a timing corresponding to a desired cell insertion interval (e.g., a 2-cell interval), indicates an address counter 13 periodically cycling to count up the counter value, and reads the counted-up value as a connection number.

Note that the logic path implies a category of a unit for management when distinguishing between the packets according to a plurality of classes within the packet switch system, and corresponds to a category of connection in the case of a connection-oriented system such as the ATM communication system and, in the case of a connectionless system such as the router system, to a category of a flow, link or session.

Next, the table access management unit 1, with the value read from the address counter 13 serving as an address, reads the valid/invalid state data from the connection management table 10, and, if the connection concerned is in a valid state, requests a cell inserting unit 14 to insert the cell (alarm cell).

Thus, when controlling the cell insertion interval, the cell inserting unit 14 forwards the insertion cells at intervals of 2 cells to a cell highway 15, corresponding to the valid connections. The address counter 13 is so constructed as to make one cycle at an interval of 1 sec, and hence an interval at which the cell is inserted into the same valid connection is 1 sec. This time interval of the cell insertion is based on the above ITU-T Recommendations.

As a result, the insertion interval of the cells generated per connection is kept over a predetermined interval. Note that if the cell insertion interval is not controlled, the insertion cells are forwarded in burst to the cell highway 15, corresponding to the valid connections.

Further, there exist other types of ATM communication systems each adopting a method of inserting the cell at a given rate by a cell shaping (band regulation) scheme. In this ATM communication system is provided with an insertion interval monitoring counter per connection, and the cell is inserted into the connection of which the insertion interval monitoring counter comes to its expiration.

FIG. 2 shows one example of an architecture of the conventional ATM communication system as a whole. This ATM communication system is constructed of a plurality of input line interfaces 20, a switch unit 21, a plurality of output line interfaces 22 and a system management unit 23. An alarm cell of the fixed-length packet, which is inserted from the cell inserting unit 24 of the input line interface 20, is switched to a preset route by the switch unit 21, and forwarded to an output-side cell highway 27 via the output line interface 22.

Further, the cell inserting unit 24 of each input line interface 20 or a cell inserting unit 25 of each output line interface 22 inserts a new cell, or temporarily stores (buffering) the cells arrived from the cell highway 26 or 27 and inserts the cell at a desired timing. On this occasion, the system management unit 23 sets a serial number of the connection into which the cell should be inserted and insertion timing data for each cell inserting unit 24 or 25.

Each of the cell inserting units 24, 25 includes a connection management table 10, a table access management unit 11, an insertion interval management counter 12, an address counter 13 and a cell inserting unit 14, which constitutes the ATM communication system shown in FIG. 1.

In this ATM communication system, when inserting the cells, the cell insertion interval and the timing are controlled so that the insertions are not consecutive, i.e., not burst. With this contrivance, it is possible to reduce a buffer capacity of a rear-stage buffer (e.g., when the cell inserting unit 24 of the input line interface 20 inserts the cell, it is a buffer 28 of the switch unit 21, and, when inserting the cell from the output line interface 25, it is a switch unit of a next-stage node (unillustrated)).

Based on the system architecture in the prior art, however, the insertion interval management counter for managing the cell insertion interval and the address counter for managing the connections, are individually provided, and therefore, if the number of connections and the insertion interval change per communication system, there is a necessity of previously providing counters corresponding to the number of connections and to the maximum insertion interval as well. This conduces to a problem in which the hardware is scaled up.

Further, there are in fact a less number of connections in use than the number of connections accommodated in the communication system. A problem inherent in the conventional architecture is that the cell insertion interval per connection is managed merely by controlling the insertion interval management counter, and hence the cell insertion interval is fixed in spite of the small number of connections in use.

Moreover, if the shaping control of inserting the cell at a fixed rate is adopted, a counter for monitoring the insertion interval is required per connection, and in addition there is needed conflict control (scheduling) when expiration timings of the counters conflict with each other for the plurality of connections, an increase in quantity of the hardware is therefore inevitable.

SUMMARY OF THE INVENTION

Accordingly, it is a primary object of the present invention to provide a packet insertion interval control system and a packet insertion interval control method that are capable of flexibly corresponding to changes in the number of connections (the number of channels) per communication system and in cell insertion interval (packet insertion interval) by restraining an increase in quantity of hardware.

It is another object of the present invention to provide a packet insertion interval control system and a packet insertion interval control method that are capable of controlling a cell (packet) insertion interval during an operation in accordance with the number of connections (the number of channels) in use.

It is a further object of the present invention to provide a packet insertion interval control system and a packet insertion interval control method that are capable of actualizing control of a rate of cells (packet) to be inserted with a less quantity of hardware by utilizing a regularity of an inverted value of LSB (Least Significant Bit) and MSB (Most Significant Bit) of a cyclic counter.

To accomplish the above objects, a first packet insertion interval control system according to the present invention comprises a counting unit, having a first bit field for managing an insertion interval of a management packet required to be cyclically inserted and a second bit field for specifying a logic path for forwarding the management packet, for executing such a counting operation as to periodically cycle the first bit field and the second bit field, and a control unit for executing control for specifying, when a count value indicated by the first bit field of the counting unit is a predetermined value, the logic path for forwarding the management packet on the basis of a count value indicated by the second bit field of the counting unit, and for inserting the management packet into the specified logic path.

In this architecture, the packet insertion interval control system may further comprise a state-of-transmission-path management module for storing valid/invalid state data about each of the logic paths. The control unit may specify the logic path for forwarding the management packet with reference to the valid state data of the state-of-transmission-path management module, which corresponds to the count value indicated by the second bit field of the counting unit.

A second packet insertion interval control system according to the present invention comprises a counting unit, having a first bit field for managing an insertion interval of a management packet required to be cyclically inserted and a second bit field for specifying a logic path for forwarding the management packet, for executing such a counting operation as to periodically cycle the first bit field and the second bit field, an inverting unit for obtaining an inverted value of LSB and MSB of the count value indicated by the second bit field of the counting unit, and a control unit for executing control for specifying, when a count value indicated by the first bit field of the counting unit is a predetermined value, the logic path for forwarding the management packet on the basis of the inverted value obtained by the inverting unit, and for inserting the management packet into the specified logic path.

In this architecture, the packet insertion interval control system may further comprise a state-of-transmission-path management module for storing valid/invalid state data about each of the logic paths. The control unit may specify the logic path for forwarding the management packet with reference to the valid state data of the state-of-transmission-path management module, which corresponds to the inverted value obtained by the inverting unit.

A third packet insertion interval control system according to the present invention comprises a counting unit, having bit fields corresponding to the number of bits necessary for managing an insertion interval of a management packet required to be cyclically inserted and for specifying a logic path for forwarding the management packet, for executing such a counting operation as to periodically cycle the bit fields, an inverting unit for obtaining an inverted value of LSB and MSB of the count value indicated by the bit field of the counting unit, and a control unit for executing control for specifying, when the inverted value obtained by the inverting unit is equal to or smaller than a maximum value of the number of the logic paths, the logic path for forwarding the management packet on the basis of the inverted value, and for inserting the management packet into the specified logic path.

In this architecture, the packet insertion interval control system may further comprise a state-of-transmission-path management module for storing valid/invalid state data about each of the logic paths. The control unit may specify, when the inverted value obtained by the inverting unit is equal to or smaller than a maximum value of the number of the logic paths, the logic path for forwarding the management packet with reference to the valid state data of the state-of-transmission-path management module, which corresponds to the inverted value obtained by the inverting unit.

A fourth packet insertion interval control system according to the present invention may further comprise a transmission path setting management unit for managing an allocation of a serial number of the logic path to be used in order of the smaller or larger number and for, when registered or deleted in or from the state-of-transmission-path state management module, setting valid/invalid state data, with the inverted value obtained by inverting LSB and MSB of the logic path number serving as an address. The control unit may specify the logic path for forwarding the management packet with reference to the valid state data of the state-of-transmission-path management module, which corresponds to the count value indicated by the second bit field of the counting unit.

A fifth packet insertion interval control system according to the present invention comprises a counting unit, having bit fields corresponding to a plurality of bits, for executing such a counting operation as to periodically cycle the bit fields, an inverting unit for obtaining an inverted value acquired by inverting LSB and MSB of a count value indicated by the bit field of the counting unit, and a control unit for executing control for specifying a logic path for forwarding a packet on the basis of the inverted value if the inverted value obtained by the inverting unit falls within a range of a predetermined threshold value as an insertion interval allocation oriented sequence value for managing an insertion interval of the packets required to be periodically inserted, and for inserting into the logic path the packets accumulated beforehand in an accumulating unit.

A sixth packet insertion interval control system according to the present invention, a plurality of ranges of the predetermined threshold values are set, and the control unit executes, if the inverted value falls within any one of these ranges of the predetermined threshold values, the control for specifying the logic path for forwarding the packet on the basis of the inverted value, and for inserting into the specified logic path the packets accumulated beforehand in the accumulating unit.

The fifth or sixth packet insertion interval control system may further comprise a state-of-transmission-path management module for storing packet existing/non-existing state data of the packets in the accumulating unit, corresponding to the logic paths. The control unit may execute the control for specifying, when the inverted value obtained by the inverting unit falls within the range of the predetermined threshold value as the insertion interval allocation oriented sequence value for managing an insertion interval of the packets required to be periodically inserted, the logic path for forwarding the management packet on the basis of the inverted value, and for inserting into the specified logic path the packets accumulated beforehand in the accumulating unit.

A seventh packet insertion interval control system according to the present invention comprises a counting unit constructed of an aggregation of counting elements each cycling with each of prime factors having, when a cyclic period is not a power of 2, the number of digits expressed by a power of a value obtained by prime-factorizing a cyclic count value, and a control unit for executing control for specifying, if an inverted value obtained by inverting a high-order digit and a low-order digit of the count value of the counting unit falls within a range of a predetermined threshold value as an insertion interval allocation oriented sequence value for managing an insertion interval of the packets required to be periodically inserted, a logic path for forwarding the packet on the basis of the inverted value, and for inserting into the specified logic path the packets accumulated beforehand in an accumulating unit.

In this architecture, a plurality of ranges of the predetermined threshold values may be set, and the control unit may execute, if the inverted value falls within any one of these ranges of the predetermined threshold values, the control for specifying the logic path for forwarding the packet on the basis of the inverted value, and for inserting into the specified logic path the packets accumulated beforehand in the accumulating unit.

The packet insertion interval control system may further comprise a state-of-transmission-path management module for storing packet existing/non-existing state data of the packets in the accumulating unit, corresponding to the logic paths. The control unit may execute the control for specifying, when the inverted value obtained by the inverting unit falls within the range of the predetermined threshold value as the insertion interval allocation oriented sequence value for managing an insertion interval of the packets required to be periodically inserted, the logic path for forwarding the management packet on the basis of the inverted value, and for inserting into the specified logic path the packets accumulated beforehand in the accumulating unit.

An eighth packet insertion interval control system according to the present invention, in the construction of the first or second or third or fourth packet insertion interval control system, may further comprise a storage module for storing in-use/unused state data about each of the logic paths, corresponding to the logic path number, and a transmission path setting management unit for managing registration and deletion of the logic path number according to each of a plurality of divided groups in the storage module, and, with the smallest or largest number being always used as a new registration number, setting the serial number of the logic path for forwarding the management packet in the state-of-transmission-path management module.

A ninth packet insertion interval control system according to the present invention, in the construction of the first or second or third or fourth packet insertion interval control system, may further comprise a storage module for storing in-use/unused state data about each of the logic paths, the serial numbers of the logic paths being arranged in tree according to digits when the serial numbers of the logic paths are expressed in a binary or other n-nary notation, and a transmission path setting management unit for managing registration and deletion of the logic path number by the storage module, and, with the smallest or largest number being always used as a new registration number, setting the serial number of the logic path for forwarding the management packet in the state-of-transmission-path management module.

A first packet insertion interval control method according to the present invention comprises a step of executing such a counting operation as to periodically cycle a first bit field for managing an insertion interval of a management packet required to be cyclically inserted and a second bit field for specifying a logic path for forwarding the management packet, and a step of specifying, when a count value indicated by the first bit field is a predetermined value, the logic path for forwarding the management packet on the basis of a count value indicated by the second bit field, and executing control for inserting the management packet into the specified logic path.

In this architecture, the second packet insertion interval control method may further comprise a step of storing valid/invalid state data about each of the logic paths in a state-of-transmission-path management module, and a step of specifying the logic path for forwarding the management packet with reference to the valid state data of the state-of-transmission-path management module, which corresponds to the count value indicated by the second bit field.

A second packet insertion interval control method comprises a step of executing such a counting operation as to periodically cycle a first bit field for managing an insertion interval of a management packet required to be cyclically inserted and a second bit field for specifying a logic path for forwarding the management packet, a step of obtaining an inverted value of LSB and MSB of the count value indicated by the second bit, and a step of executing control for specifying, when a count value indicated by the first bit field is a predetermined value, the logic path for forwarding the management packet on the basis of the inverted value obtained, and for inserting the management packet into the specified logic path.

In this architecture, the packet insertion interval control method may further comprise a step of storing valid/invalid state data about each of the logic paths a state-of-transmission-path management module, and a step of specifying the logic path for forwarding the management packet with reference to the valid state data of the state-of-transmission-path management module, which corresponds to the inverted value obtained. Here, the number of the logic paths is allocated in order to the smaller or larger number so that the valid/invalid state data may become continuous.

A third packet insertion interval control method comprises a step of executing such a counting operation as to periodically cycle bit fields corresponding to the number of bits necessary for managing an insertion interval of a management packet required to be cyclically inserted and for specifying a logic path for forwarding the management packet, a step of obtaining an inverted value of LSB and MSB of the count value indicated by the bit field, and a step of executing control for specifying, when the inverted value obtained is equal to or smaller than a maximum value of the number of the logic paths, the logic path for forwarding the management packet on the basis of the inverted value, and for inserting the management packet into the specified logic path.

In this architecture, the packet insertion interval control method may further comprise a step of storing valid/invalid state data about each of the logic paths in a state-of-transmission-path management module, and a step of specifying, when the inverted value is equal to or smaller than a maximum value of the number of the logic paths, the logic path for forwarding the management packet with reference to the valid state data of the state-of-transmission-path management module, which corresponds to the inverted value. Here, the number of the logic paths is allocated in order to the smaller or larger number so that the valid/invalid state data may become continuous.

A fourth packet insertion interval control method, in the architecture of the first packet insertion interval control method, may further comprise a step of managing an allocation of a serial number of the logic path to be used in order of the smaller or larger number and of, when registered or deleted in or from the state-of-transmission-path state management module, setting valid/invalid state data, with the inverted value obtained by inverting LSB and MSB of the logic path number serving as an address, and a step of specifying the logic path for forwarding the management packet with reference to the valid state data of the state-of-transmission-path management module, which corresponds to the count value indicated by the second bit field of the counting unit.

A fifth packet insertion interval control method comprises a step of executing such a counting operation as to periodically cycle bit fields corresponding to a plurality of bits, a step of obtaining an inverted value acquired by inverting LSB and MSB of a count value indicated by the bit field, and a step of executing control for specifying a logic path for forwarding a packet on the basis of the inverted value if the inverted value obtained falls within a range of a predetermined threshold value as an insertion interval allocation oriented sequence value for managing an insertion interval of the packets required to be periodically inserted, and for inserting into the logic path the packets accumulated beforehand in an accumulating unit.

A sixth packet insertion interval control method, in the above architecture, may further comprise a step of setting a plurality of ranges of the predetermined threshold values, and executing, if the inverted value falls within any one of these ranges of the predetermined threshold values, the control for specifying the logic path for forwarding the packet on the basis of the inverted value, and for inserting into the specified logic path the packets accumulated beforehand in the accumulating unit.

A packet insertion interval control method, in the architecture of the fifth or sixth packet insertion interval control method, may further comprise a step of storing packet existing/non-existing state data of the packets in the accumulating unit in a state-of-transmission-path management module, corresponding to the logic paths, and a step of executing the control for specifying, when the inverted value obtained falls within the range of the predetermined threshold value as the insertion interval allocation oriented sequence value for managing an insertion interval of the packets required to be periodically inserted, the logic path for forwarding the management packet on the basis of the inverted value, and for inserting into the specified logic path the packets accumulated beforehand in the accumulating unit.

A seventh packet insertion interval control method comprises a step of configuring an aggregation of counting elements each cycling with each of prime factors having, when a cyclic period is not a power of 2, the number of digits expressed by a power of a value obtained by prime-factorizing a cyclic count value, and a step of executing control for specifying, if an inverted value obtained by inverting a high-order digit and a low-order digit of the count value of the aggregation of counting elements falls within a range of a predetermined threshold value as an insertion interval allocation oriented sequence value for managing an insertion interval of the packets required to be periodically inserted, a logic path for forwarding the packet on the basis of the inverted value, and for inserting into the specified logic path the packets accumulated beforehand in an accumulating unit.

In this architecture, the packet insertion interval control method may further comprise a step of setting a plurality of ranges of the predetermined threshold values, and executing, if the inverted value falls within any one of these ranges of the predetermined threshold values, the control for specifying the logic path for forwarding the packet on the basis of the inverted value, and for inserting into the specified logic path the packets accumulated beforehand in the accumulating unit.

An eighth packet insertion interval control method, in the architecture of the first or second or third or fourth packet insertion interval control method, may further comprise a step of storing packet existing/non-existing state data of the packets in the accumulating unit in a state-of-transmission-path management module, corresponding to the logic paths, and a step of executing the control for specifying, when the inverted value obtained falls within the range of the predetermined threshold value as the insertion interval allocation oriented sequence value for managing an insertion interval of the packets required to be periodically inserted, the logic path for forwarding the management packet on the basis of the inverted value, and for inserting into the specified logic path the packets accumulated beforehand in the accumulating unit.

A ninth packet insertion interval control method, in the architecture of the first or second or third or fourth packet insertion interval control method, may further comprise a step of storing in-use/unused state data about each of the logic paths in a storage module, corresponding to the logic path number, and a step of managing registration and deletion of the logic path number according to each of a plurality of divided groups in the storage module, and, with the smallest or largest number being always used as a new registration number, setting the serial number of the logic path for forwarding the management packet in the state-of-transmission-path management module.

According to the present invention, it is feasible to flexibly correspond to changes in the number of connections (the number of channels) per communication system and in cell insertion interval (packet insertion interval) by restraining an increase in quantity of hardware. As a result, a traffic of the management packets to be inserted can be smoothed, and hence a necessary buffer capacity in a packet multiplexer provided at a rear stage can be decreased.

Further, according to the present invention, it is possible to control the cell (packet) insertion interval during an operation in accordance with the number of connections (the number of channels) in use. As a consequence, the traffic of the management packets to be inserted can be more effectively smoothed.

Moreover, according to the present invention, it is feasible to actualize control of a rate of cells (packet) to be inserted with a less quantity of hardware by utilizing a regularity of an inverted value of LSB (Least Significant Bit) and MSB (Most Significant Bit) of a cyclic counter.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which:

FIG. 10 is an explanatory chart showing examples of patterns of the cells to be inserted in the ATM communication system in the third embodiment;

FIG. 17 is an explanatory chart showing examples of patterns of the cells to be inserted in the ATM communication system in the sixth embodiment;

FIG. 18 is an explanatory block diagram showing an outline of configuration and function of a cyclic counter in the ATM communication system in a seventh embodiment of the present invention;

FIG. 19 is an explanatory block diagram showing the outline of configuration and function of the cyclic counter in the ATM communication system in the seventh embodiment of the present invention;

FIG. 20 is an explanatory chart showing examples of patterns of the cells to be inserted in the ATM communication system in the sixth embodiment;

DETAILED DESCRIPTION OF THE PREFERRED EMBODIMENTS

Embodiment of the present invention will hereinafter be described with reference to the accompanying drawings.

[First Embodiment]

Figure 3:
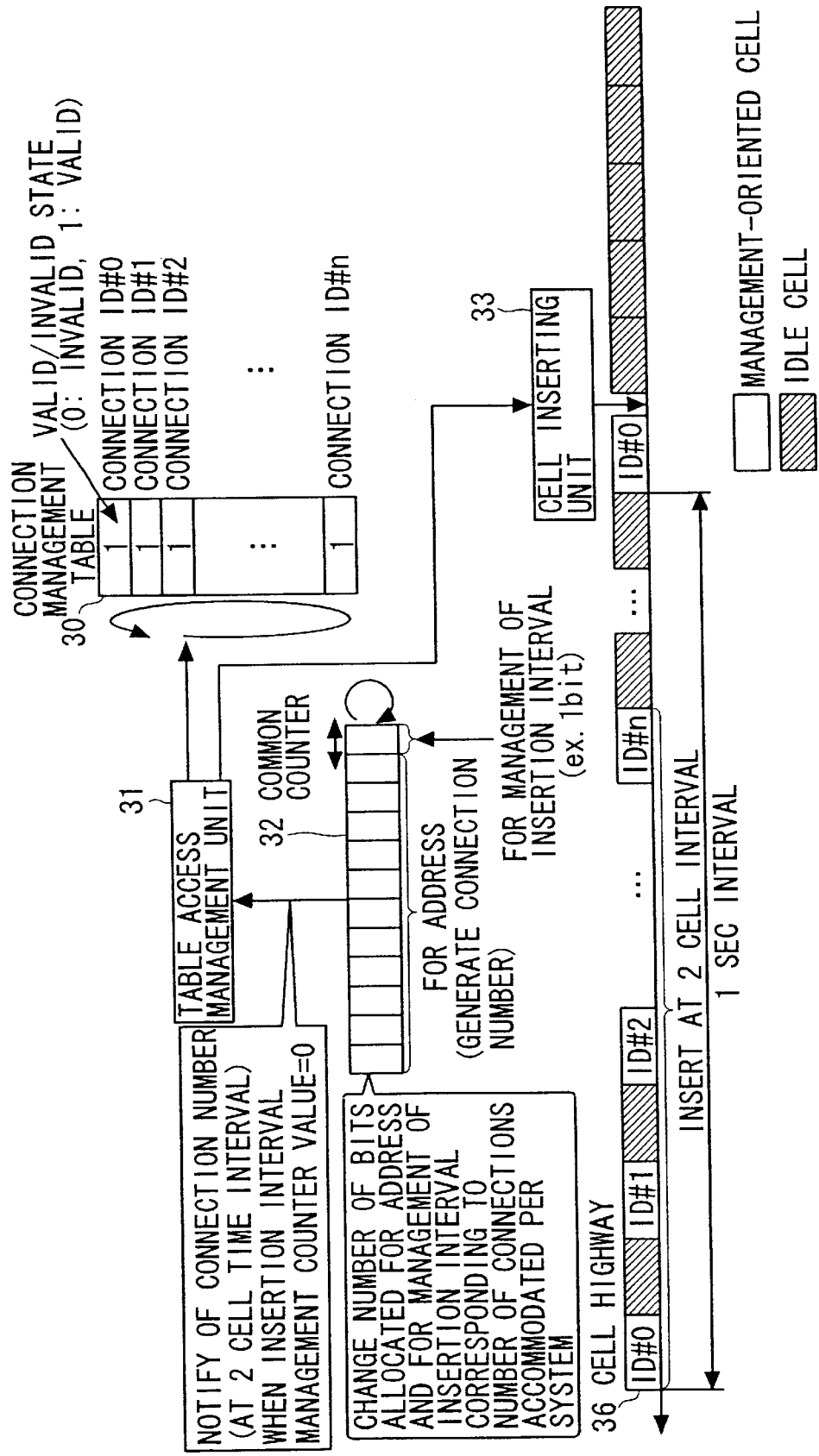
FIG. 3 is an explanatory block diagram showing an outline of architecture of an ATM communication system in a first embodiment of the present invention.
Figure 4:
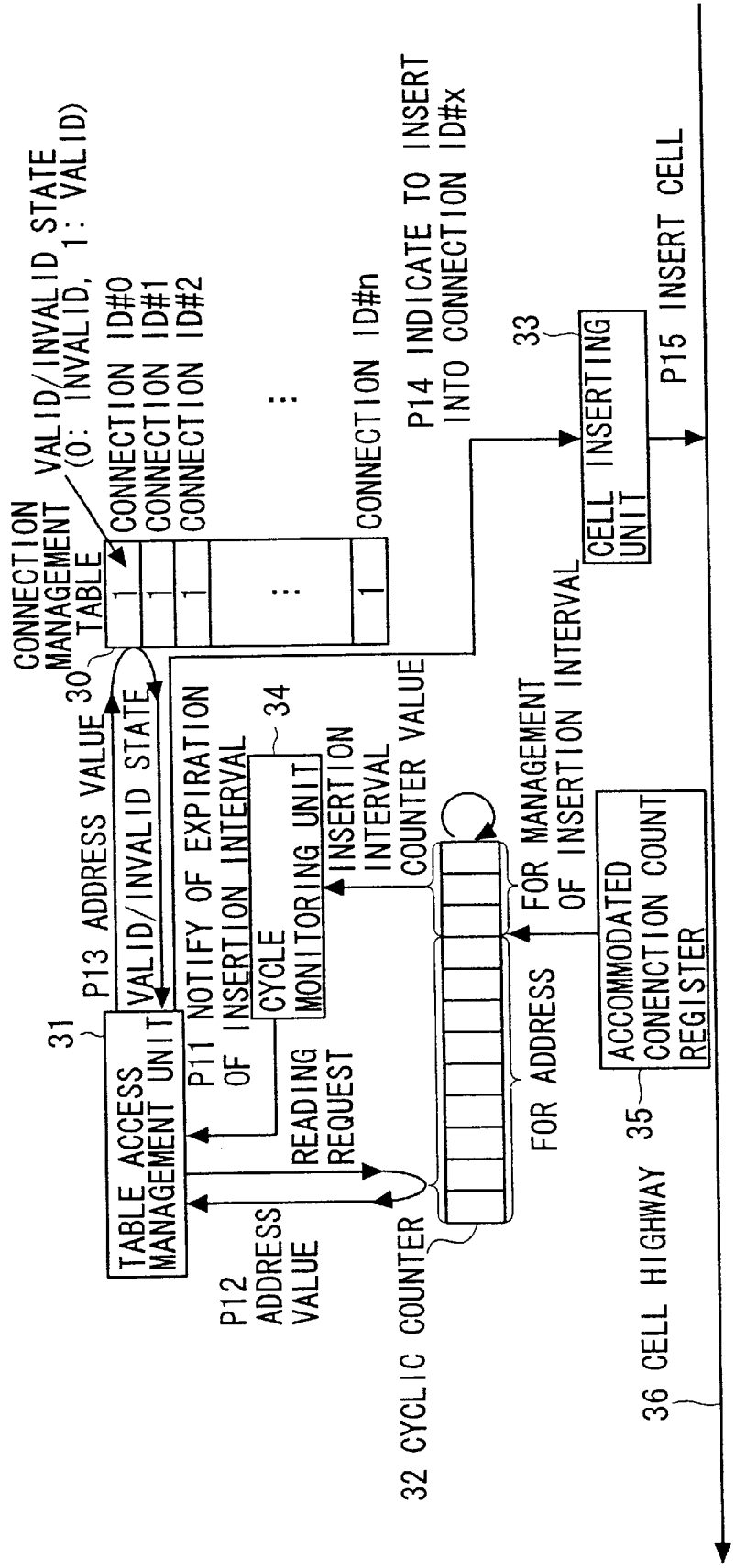
FIG. 4 is an explanatory block diagram showing a specific architecture and function of the ATM communication system in the first embodiment of the present invention.

FIG. 3 is a block diagram showing an outline of architecture of an ATM communication system in a first embodiment of the present invention. Further, FIG. 4 is an explanatory block diagram showing a specific architecture and function of the ATM communication system in the first embodiment of the present invention. Referring to FIGS. 3 and 4, the ATM communication system includes a connection management table 30, a table access management unit 31, a cyclic counter 32 serving as a common counter, a cell inserting unit 33, a cycle monitoring unit 34 and an accommodated connection count register 35.

What is characteristic of this ATM communication system is that a counter for managing an interval of inserting a management-oriented cell of a fixed-length packet and an address-oriented counter for generating a connection number, are actualized by way of one single common counter 32, and that an allocation of a bit size of the common counter 32 is changed corresponding to the number of connections needed in a communication system (or the ATM communication system).

Pieces of valid/invalid state data (1: valid, 0: invalid) of connections ID#0, ID#1, ID#2m . . . , ID#n are preset in the connection management table 30. What is preset as a connection in a valid state is an in-use connection as well as being a connection requiring periodic or cyclic insertions of the management-oriented cells. On the other hand, what is preset as a connection in an invalid state is an unused connection among the connections accommodated. Setting of the valid/invalid state data in the connection management table 30 is done beforehand by host application software etc.

The cyclic counter 32 constituting the common counter is incremented at an interval of 1-cell time synchronizing with a cell highway 36, and cycles at a fixed cycle. A maximum value of the number of bits of the cyclic counter 32 that is allocated for the insertion interval management and for address, is $2^{21}-1$ (=2097151) which is a maximum value of power of 2 of 1440000−1 or under in the case of applying a binary cyclic counter for counting 0~1440000−1 for, e.g., 1 second. Therefore, the cyclic counter 32 is a 21-bit counter and is, when a counter value comes to 1440000, cleared to 0.

Further, when taking a 12-digit construction, there may also be applied the cyclic counter 32 that cycles from 0 to 1440000−1 (for more details, refer to a seventh embodiment that will hereinafter be discussed). Note that in the following discussions on the respective embodiments, as far as it is not particularly specified, the terms [digit] and [bit] are defined the same in terminology.

Of the number of bits of the cyclic counter 32, a number of bits corresponding to a value preset in the accommodated connection count register 35 in accordance with an operation state, are allocated for address, and a number of remaining bits are allocated to for the insertion interval management.

The cycle monitoring unit 34 monitors a bit value in a first bit field that is allocated for the insertion interval management, and, when coming to a given value (e.g., 0), notifies the table access management unit 31 of an expiration of the insertion interval (processing step P11). The table access management unit 31, when notified of the expiration of the insertion interval from the cycle monitoring unit 34, requests the cyclic counter 32 to read an address value (P12).

Next, the table access management unit 31, with this address value serving as an address, reads the connection valid/invalid data in the connection management table 30, thereby distinguishing between a validity and an invalidity of the corresponding connection (P13).

As a result of this distinguishing process, the table access management unit 31, if the corresponding connection is valid, indicates the cell inserting unit 33 to insert the management-oriented cell of a corresponding connection number (ID #x) (P14). The cell inserting unit 33 inserts, into the cell highway 36, the management-oriented cell corresponding to the connection number notified (P15).

FIG. 3 shows a state where the management-oriented cell is inserted into the cell highway 36 at a 2-cell interval corresponding to the connections ID#0 . . . ID#n in the valid state. Further, an insertion cycle of the management-oriented cell with respect to the connection with the same number, is 1 second on the basis of ITU-T Recommendations. A time position indicated by hatching on the cell highway 36 corresponds to an idle cell.

Figure 1:
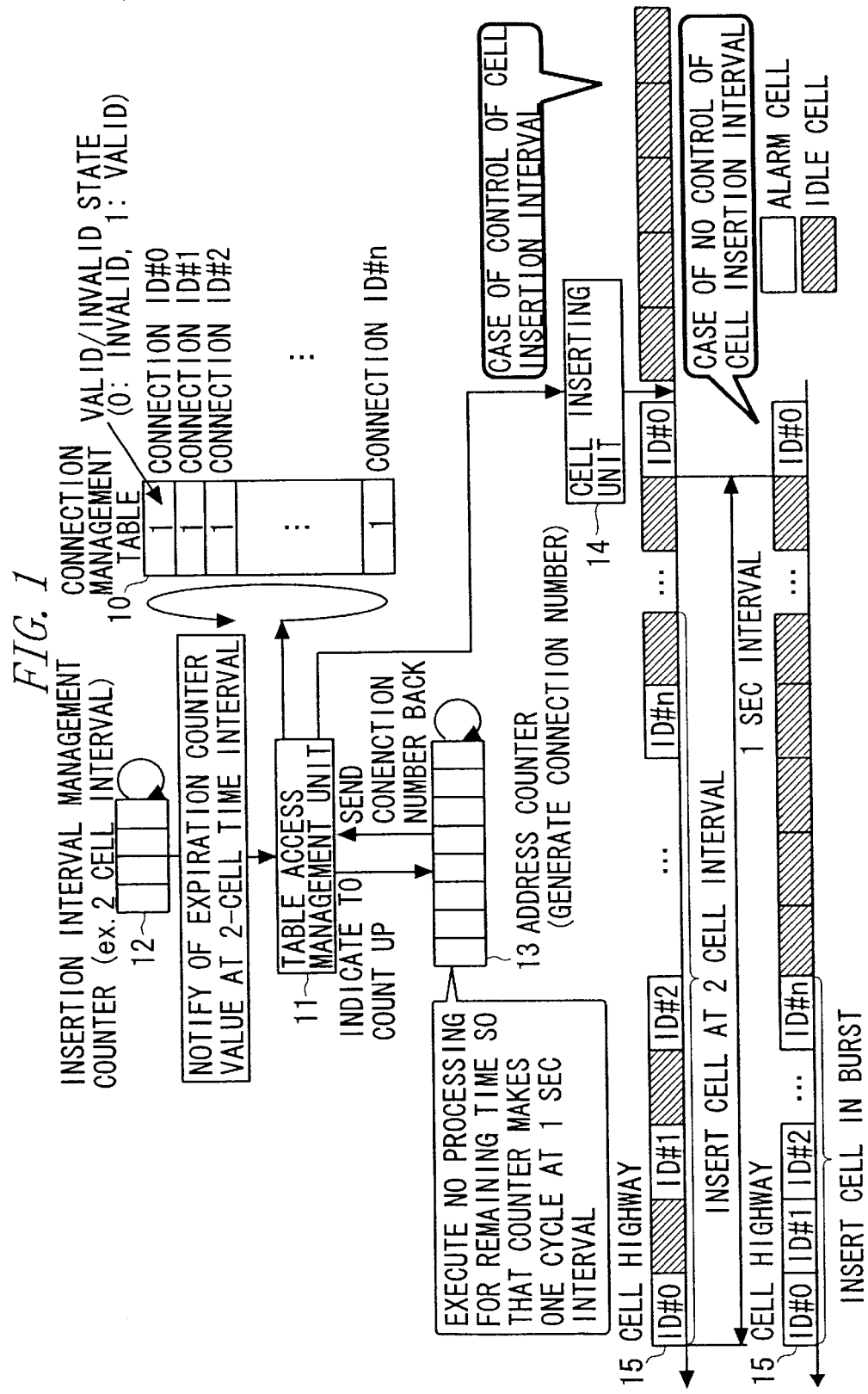
FIG. 1 is an explanatory view showing an architecture and function of an ATM communication system in the prior art.
Figure 2:
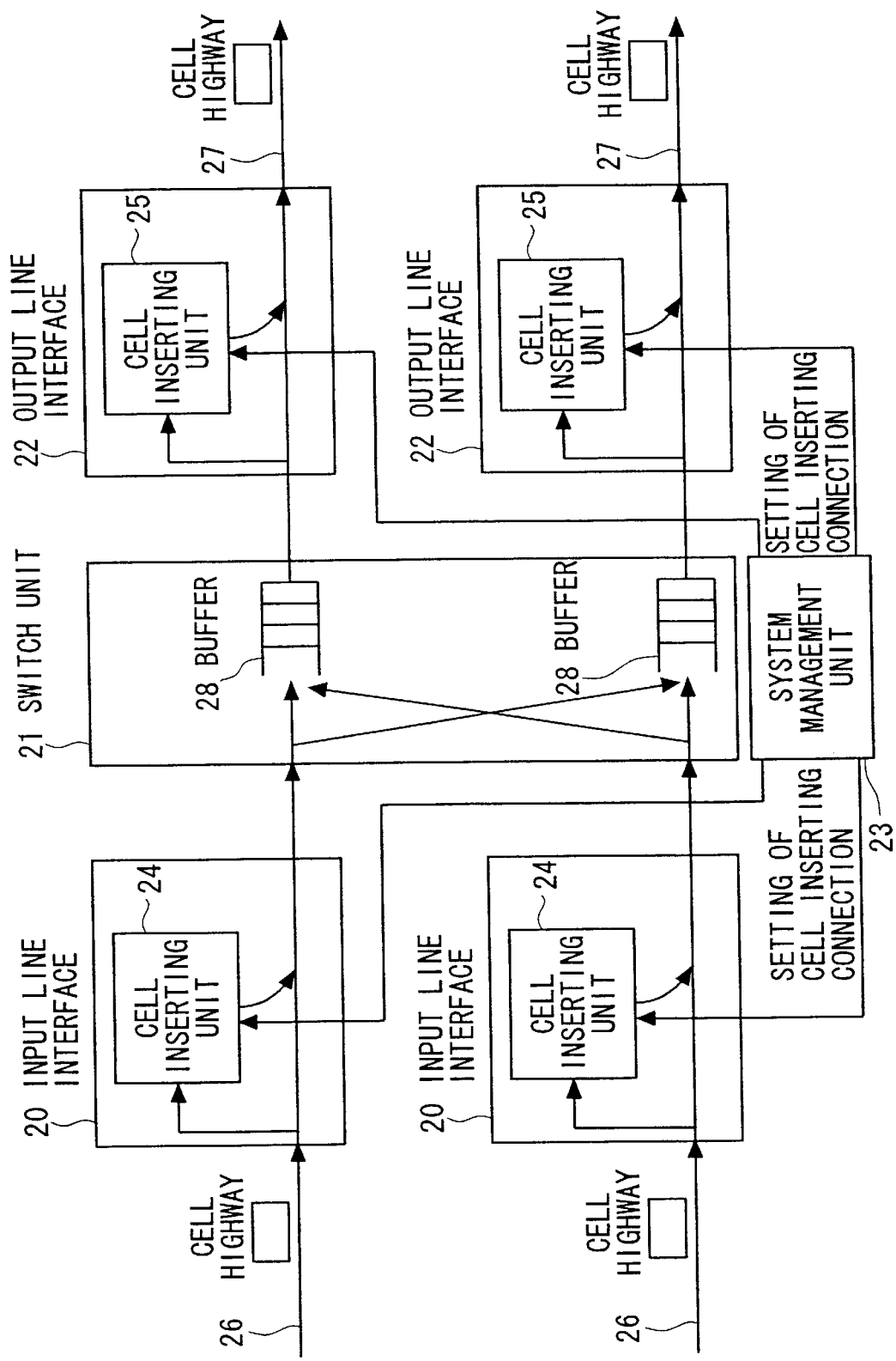
FIG. 2 is a block diagram showing an architecture of the whole ATM communication system in the prior art.

In the ATM communication system, it is effective in preventing a reduction in buffer quantity of a cell multiplexing unit (such as a buffer 28 of a switch unit 21 shown in FIG. 1) provided at a rear stage and in preventing a cell discard due an overflow of the buffer that a burst of the management-oriented cells to be inserted is reduced by expanding to the greatest possible degree the interval of the management-oriented cell for insertion between the respective connections. Herein, if the cell insertion cycle per connection is fixed, the maximum value of the cell insertion interval depends on the number of connections accommodated in each system.

In the conventional ATM communication system, it is required for changing the insertion interval corresponding to the number of connections accommodated that there be separately provided the insertion interval management oriented counter having the number of bits enough to count a maximum insertion interval presumed beforehand.

As discussed above, the counter in the ATM communication system according to the first embodiment serves as both of the address-oriented counter and the insertion interval management oriented counter, and there exists a contradictory relation between the number of connections accommodated in each communication system or each ATM communications system and the corresponding insertion interval. Then, the bit size of the common cyclic counter is fixed, and hence there is no necessity of individually preparing the insertion interval management oriented counter having the number of bits enough to count the maximum insertion interval. Accordingly, it is feasible to reduce more of the hardware quantity than by the conventional system architecture.

[Second Embodiment]

Figure 5:
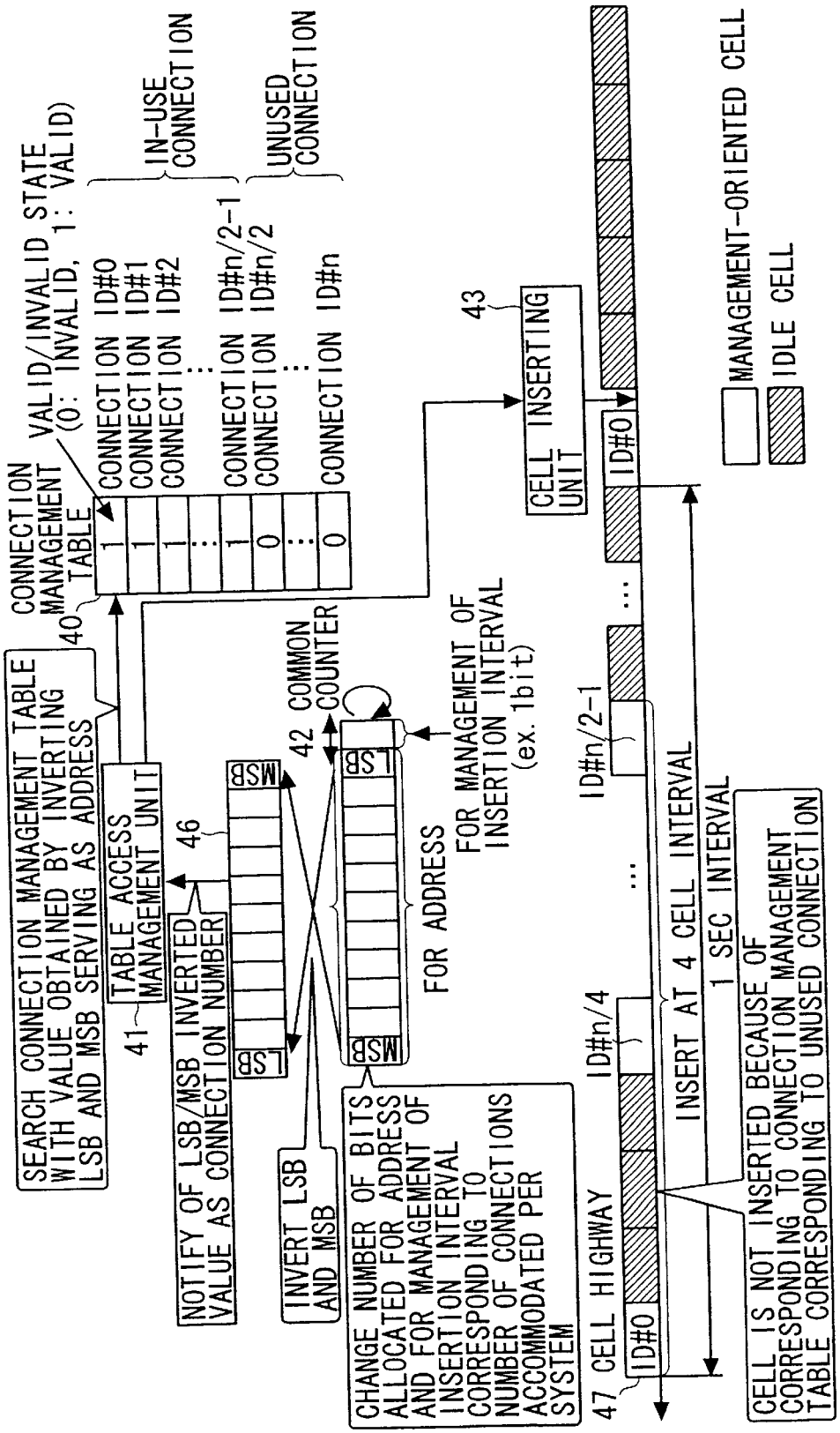
FIG. 5 is an explanatory block diagram showing an outline of architecture of the ATM communication system in a second embodiment of the present invention.

FIG. 5 is a block diagram showing an outline of architecture of the ATM communication system in a second embodiment of the present invention. Further, FIG. 6 is an explanatory block diagram showing a specific architecture and function of the ATM communication system in the second embodiment of the present invention.

Figure 6:
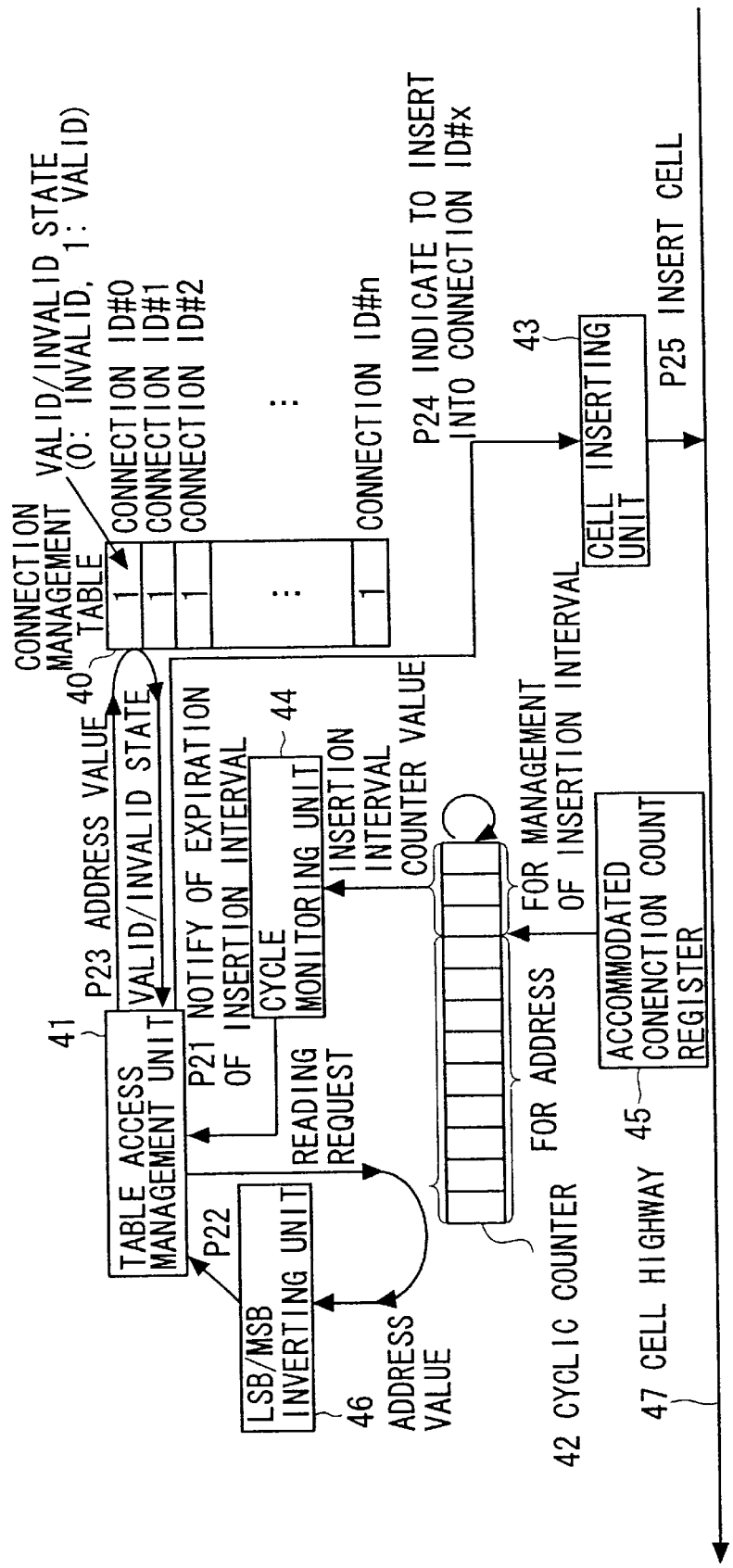
FIG. 6 is an explanatory block diagram showing a specific architecture and function of the ATM communication system in the second embodiment of the present invention.

Referring to FIGS. 5 and 6, the ATM communication system includes a connection management table 40, a table access management unit 41, a cyclic counter 42 serving as a common counter, a cell inserting unit 43, a cycle monitoring unit 44, an accommodated connection count register 45 and an LSB/MSB inverting unit 46. Note that if there are omitted explanations of the architecture and function of the ATM communication system in the second embodiment which will hereinafter be discussed, those are the same with the ATM communication system in the first embodiment.

What is characteristic of the present ATM communication system is that the value in the address-oriented counter (the second bit field) of the cyclic counter 42 is, unlike the ATM communication system in the first embodiment, not used directly as the connection number, and the connection management table 40 can be accessed, wherein a value obtained by inverting LSB and MSB is used as a connection number.

The cycle monitoring unit 44 monitors a bit value in the first bit field that is allocated for the insertion interval management of the cyclic counter 42, and, when becoming a given value (e.g., 0), notifies the table access management unit 41 of an expiration of the insertion interval (processing step P21).

The table access management unit 41, when notified of the expiration of the insertion interval from the cycle monitoring unit 44, issues a reading request to the cyclic counter 32. Responding to this reading request, the cyclic counter 42 sends an address value to the LSB/MSB inverting unit 46 from the address-oriented counter. The LSB/MSB inverting unit 46 notifies the table access management unit 41 of a value obtained by inverting LSB (Least Significant Bit) and MSB (Most Significant Bit) of the address value read from the address-oriented counter of the cyclic counter 42 (P22).

Next, the table access management unit, with this address value serving as an address, reads the connection valid/invalid data in the connection management table 40, thereby distinguishing between a validity and an invalidity of the corresponding connection (P23). Here, the connection valid/invalid data is allocated in order to the smaller or larger number so that the connection valid/invalid data may become continuous.

As a result of this distinguishing process, the table access management unit 41, if the corresponding connection is valid, indicates the cell inserting unit 43 to insert the management-oriented cell of a corresponding connection number (ID #x) (P24) The cell inserting unit 43 inserts, into a cell highway 47, the management-oriented cell corresponding to the connection number notified (P25).

FIG. 5 shows a state where the management-oriented cell is inserted into the cell highway 47 at a 4-cell interval corresponding to the connections ID#0 . . . ID#n/2-1 in the valid state.

Figure 7:
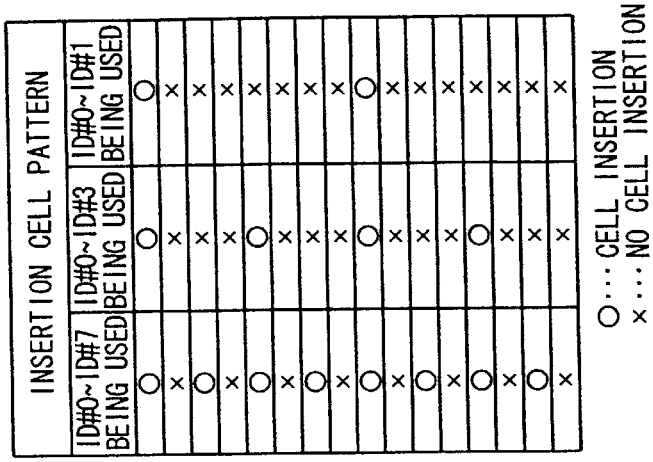
FIG. 7 is an explanatory chart showing examples of patterns of the cells to be inserted in the ATM communication system in the second embodiment.

FIG. 7 shows relations between LSB/MSB inverted values and cell patterns when the number of accommodated connections is [16]. When the in-use (valid) connection numbers are ID#0~ID#7, if sequence values obtained by effecting the LSB/MSB inversion are [0]~[7], it follows that each in-use connection management table 40 is accessed, and hence the cell insertion into the in-use connection is executed every second cell, i.e., at intervals of two cells. Similarly, when the in-use connection numbers are ID#0~ID#3 and ID#0~ID#1, the management-oriented cell insertion into e in-use connection is carried out every fourth cell (at intervals of 4 cells) and every eighth cell (at intervals of 8 cells), and, with a decrease in the number of connections in use, the cell insertion interval can be expanded.

In the normal operation state, there are many cases where the number of connections actually used is smaller than the number of connections accommodated in the communication system, and, in the case of taking the unused connection into consideration, the maximum value of the cell insertion interval can be further increased. In the ATM communication system according to the first embodiment, the insertion interval management oriented counter of the cyclic counter 32 is common in the communication system, and hence, though capable of changing the cell insertion interval corresponding to the number of connections accommodated beforehand in the system, it is difficult to change the insertion interval corresponding to the number of connections in use.

In the ATM communication system in the second embodiment discussed above, the sequence obtained by inverting LSBs and MSBs of the output address values of the address-oriented counter of the cyclic counter 42 in the LSB/MSB inverting unit 46, is allocated as connection numbers. The LSB/MSB inverted values have a characteristic of taking discrete values, and therefore, if the in-use connection number and the unused connection number are consecutive values, the unused connections and the in-use connections are read in a state of being mixed to a moderate extent. The cell insertion interval with respect to the in-use connection takes a form of being interleaved with the reading with respect to the unused connection. Thus, the insertion interval of the management-oriented cell can be changed corresponding to the number of in-use connections.

[Third Embodiment]

Figure 8:
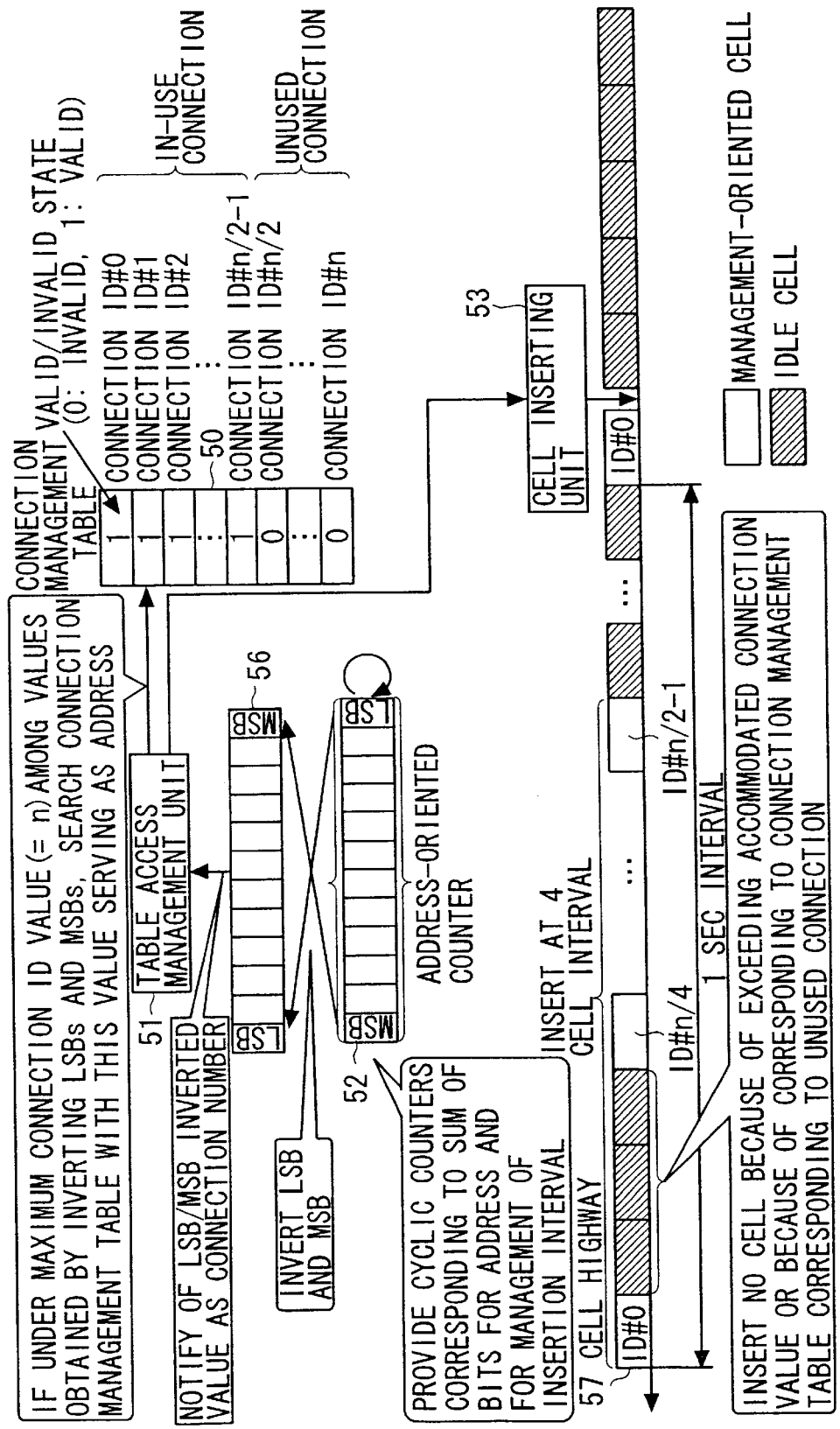
FIG. 8 is an explanatory block diagram showing an outline of architecture of the ATM communication system in a third embodiment of the present invention.

FIG. 8 is a block diagram showing an outline of architecture of the ATM communication system in a third embodiment of the present invention. Further, FIG. 9 is an explanatory block diagram showing a specific architecture and function of the ATM communication system in the third embodiment of the present invention.

Figure 9:
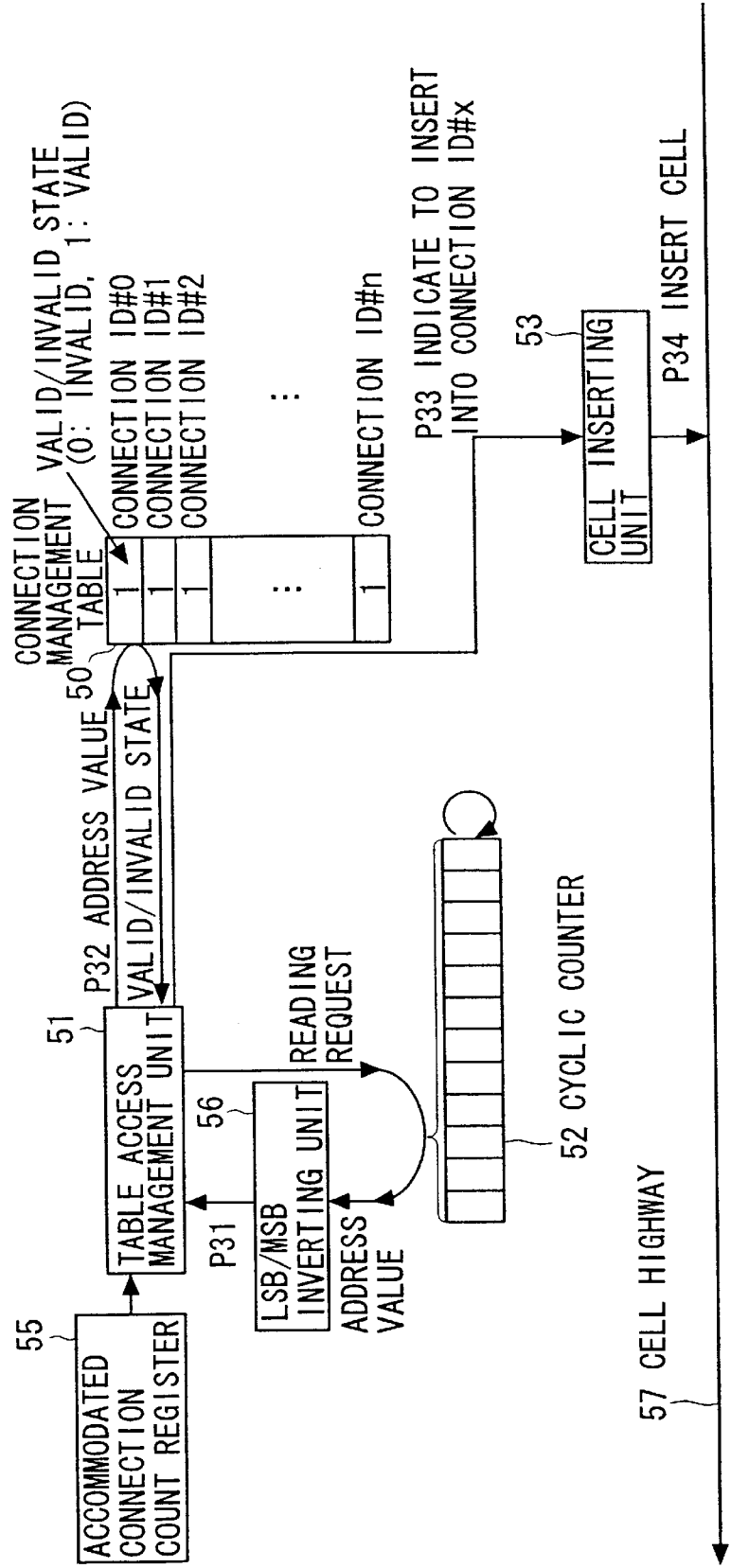
FIG. 9 is an explanatory block diagram showing a specific architecture and function of the ATM communication system in the third embodiment of the present invention.

Referring to FIGS. 8 and 9, the ATM communication system includes a connection management table 50, a table access management unit 51, a cyclic counter 52 serving as a common counter, a cell inserting unit 53, an accommodated connection count register 55 and an LSB/MSB inverting unit 56. Note that if there are omitted explanations of the architecture and function of the ATM communication system in the third embodiment which will hereinafter be discussed, those are the same with the ATM communication system in the first embodiment.

In this ATM communication system, the cyclic counter 52 has a larger proportion of the address-oriented counters by a bit size corresponding to the insertion interval management oriented counter for the management-oriented cells. The table access management unit 51 reads the valid/invalid state data of each of the connections from the connection management table 50, wherein a value obtained by inverting LSB and MSB of the address value given from the address-oriented counter of the cyclic counter 52, is used as a connection number. What is characteristic on this occasion is that values larger than the number of connections accommodated are ruled out of the range, and no accessing to the connection management table 50 is executed.

The data access management unit 51 sends the reading request to the cyclic counter 52 at intervals of cell time. The LSB/MSB inverting unit 56 inverts LSB and MSB of a response address value given from the cyclic counter 52, and notifies the table access management unit 51 of the inverted value as an address value (processing step P31).

The table access management unit 51 checks whether or not the address value received from the LSB/MSB inverting unit 56 falls within a range of the values stored in the accommodated connection count register 55. As a result, the table access management unit 51, if out of the range, does not execute the cell inserting process from this onward. Whereas if within the range, the table access management unit 51, with this address value serving as an address, reads the connection valid/invalid state data in the connection management table 50, thereby distinguishing between a validity and an invalidity of the corresponding connection (P32). Here, the connection valid/invalid data is allocated in order to the smaller or larger number so that the connection valid/invalid data may become continuous.

As a result of this distinguishing process, the table access management unit 51, if the corresponding connection is valid, indicates the cell inserting unit 53 to insert the management-oriented cell of a corresponding connection number (ID #x) (P33). The cell inserting unit 53 inserts, into a cell highway 57, the management-oriented cell corresponding to the connection number notified (P34). FIG. 8 shows a state where the management-oriented cell is inserted into the cell highway 57 at a 4-cell interval corresponding to the connections ID#0 . . . ID#n/2-1 in the valid state.

Note that the reading process from the table access management unit 51 to the cyclic counter 52 may be executed based on a cyclic interruption from the cyclic counter 52.

Figure 10:
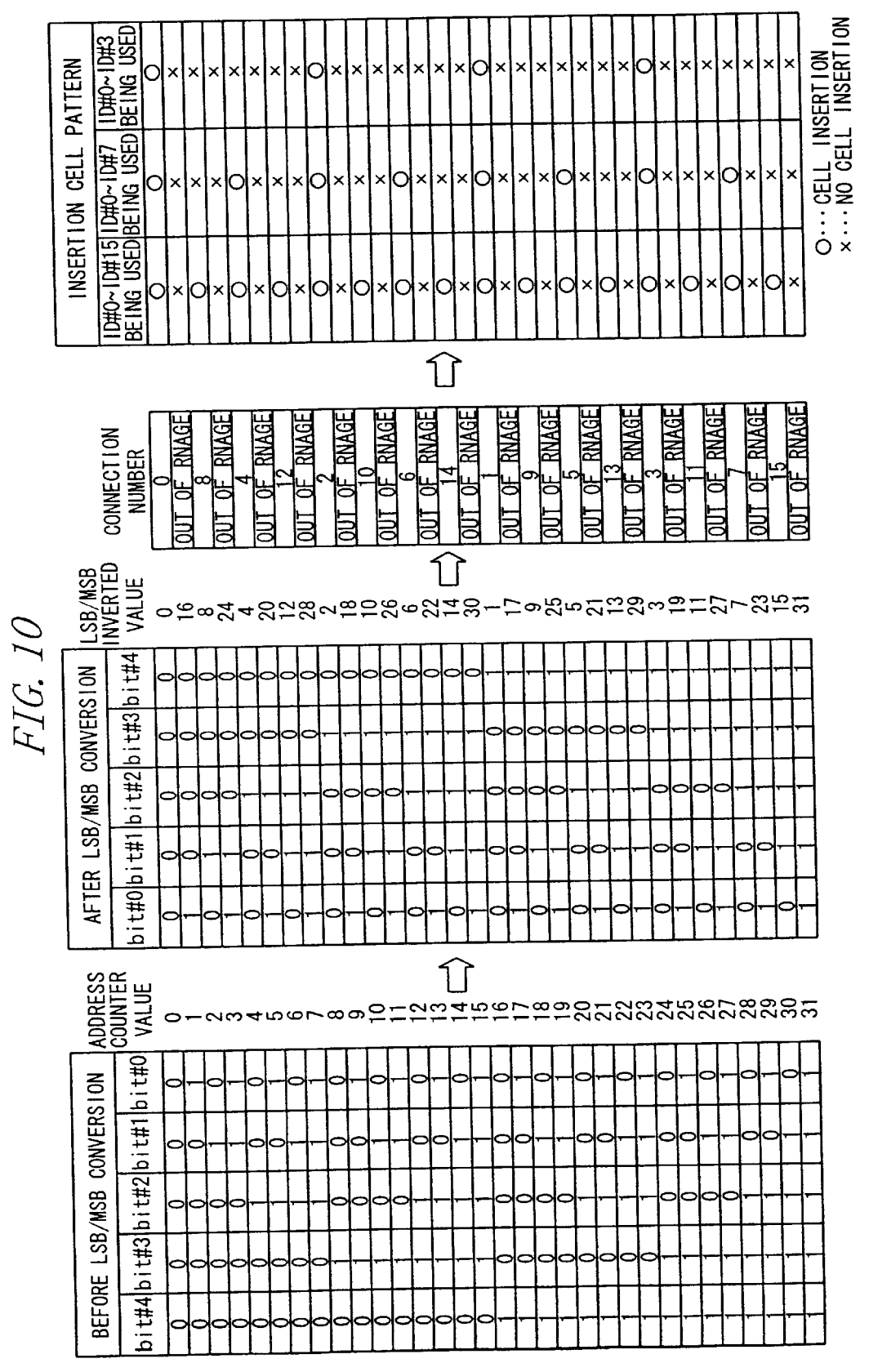

FIG. 10 shows relations between LSB/MSB inverted values and cell patterns when the number of accommodated connections is [16] and when the cyclic counter 52 counts 0~31. If sequence values obtained by effecting the LSB/MSB inversion are 0~15, the process of reading the valid/invalid state data in the connection management table 50 is executed corresponding to the connection number. If the sequence values obtained by the LSB/MSB inversion are 16~31, however, these values are out of the range, and no reading process from the connection management table 50 is carried out.

As shown in FIG. 10, the values obtained by the LSB/MSB inversion, the values ruled out of the range and the valid values alternately correspond to each other, and hence the management-oriented cell is inserted at the intervals of 2 or more cells irrespective of the number of the in-use connections.

In the ATM communication system according to the third embodiment discussed above, the cyclic counter 52 having the bit size equal to an addition of the bit size of the address-oriented counter that corresponds to the number of connections accommodated and the bit size of the insertion interval management oriented count, is obtained by extending the address-oriented counter. If the sequence value obtained by inverting LSB and MSB of the address value of the cyclic counter 52 is equal to or larger than the number of connections accommodated, this value is ruled out of the range, and no accessing to the connection management table 50 is executed. Thus, there is no necessity of executing the process by separately providing the insertion interval management oriented counter, and therefore a scale of the control circuit for the insertion interval management oriented counter can be reduced to a greater degree than in the ATM communication system in the second embodiment discussed above.

[Fourth Embodiment]

Figure 11:
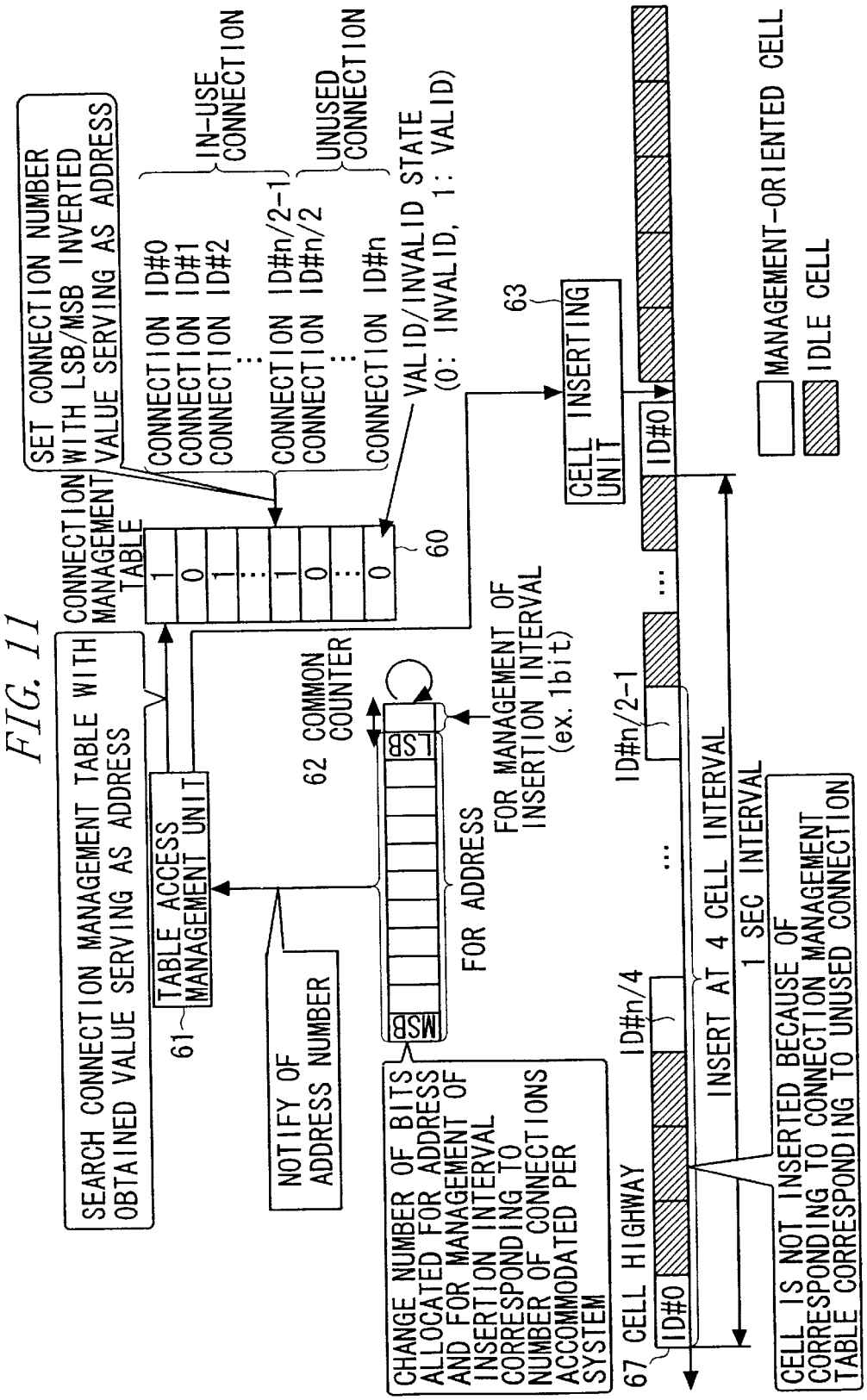
FIG. 11 is an explanatory block diagram showing an outline of architecture of the ATM communication system in a fourth embodiment of the present invention.

FIG. 11 is a block diagram showing an outline of architecture of the ATM communication system in a fourth embodiment of the present invention. Further, FIG. 12 is an explanatory block diagram showing a specific architecture and function of the ATM communication system in the fourth embodiment of the present invention.

Figure 12:
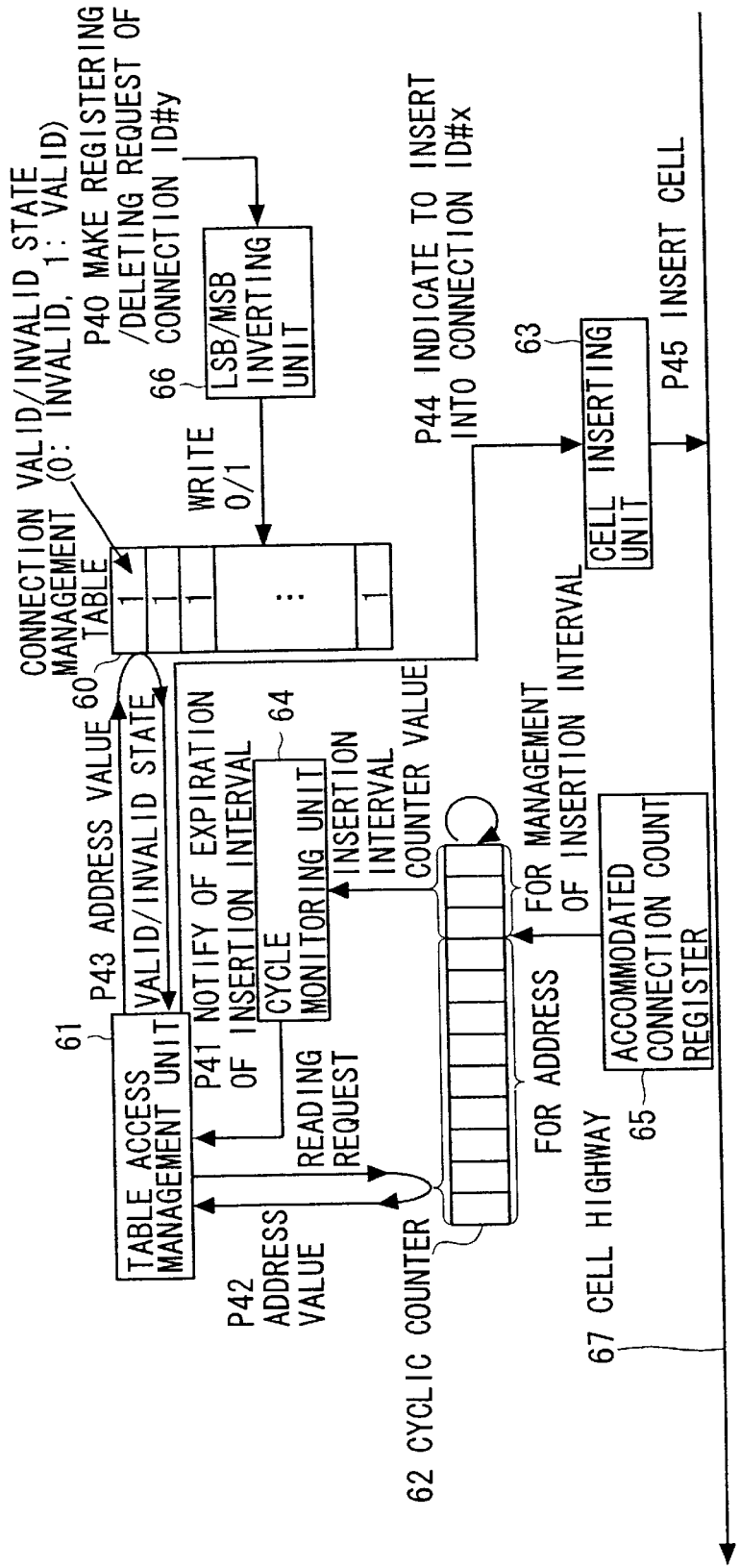
FIG. 12 is an explanatory block diagram showing a specific architecture and function of the ATM communication system in the fourth embodiment of the present invention.

Referring to FIGS. 11 and 12, the ATM communication system includes a connection management table 60, a table access management unit 61, a cyclic counter 62 serving as a common counter, a cell inserting unit 63, an accommodated connection count register 65 and an LSB/MSB inverting unit 66. Note that if there are omitted explanations of the architecture and function of the ATM communication system in the fourth embodiment which will hereinafter be discussed, those are the same with the ATM communication system in each of the embodiments discussed above.

What is characteristic of this ATM communication system is not that LSB and MSB of the address value are inverted when accessing the connection management table 60 but that the connection number is set in a location of the address obtained by the LSB/MSB inversion.

When the LSB/MSB inverting unit 66 sets the valid/invalid state data (1: valid, 0: invalid) of the connections ID#0 . . . ID#n in a connection management table 60 in response to a request for registering or deleting the connection ID#y that is given from the host application software, LSB and MSB of the address value in the table 60 are inverted. The LSB/MSB inverting unit 66, with this inverted value serving as an address, writes beforehand the valid/invalid state data of the connections ID#0 . . . ID#n to the connection management table 60 (processing step P40).

The cycle monitoring unit 64 monitors values of low-order 3 bits in the bit field (digit field) that are allocated for the insertion interval management of the cyclic counter 62, and, when becoming a given value (e.g., 0), notifies the table access management table 61 of an expiration of the insertion interval (P41). The table access management unit 61, when notified of the expiration of the insertion interval from the cycle monitoring unit 64, issues a reading request to the cyclic counter 62 to read the address value (P42).

Next, the table access management unit 61, with this address value serving as an address, reads the valid/invalid data of the connections ID#0 . . . ID#n in the connection management table 60, thereby distinguishing between a validity and an invalidity of the corresponding connection (P43).

As a result of this distinguishing process, the table access management unit 61, if the corresponding connection is valid, indicates the cell inserting unit 63 to insert the management-oriented cell of a corresponding connection number (ID#x) (P44). The cell inserting unit 63 inserts, into a cell highway 67, the management-oriented cell corresponding to the connection number notified (45). FIG. 11 shows a state where the management-oriented cell is inserted into the cell highway 57 at a 4-cell interval corresponding to the connections ID#0 . . . ID#n/2-1 in the valid state.

In the ATM communication system according to the fourth embodiment discussed above, when setting the valid/invalid state data of the connection ID#y in the connection management table 60, the connection number is set, in which the LSB/MSB inverted value serves as an address. The table access management unit 61 reads the state data of the respective connections in the connection management table 60 while sequentially incrementing the address value.

As in the ATM communication system according to the second embodiment discussed above, when reading the state data of the respective connections, even if read in the way of inverting LSB and MSB of the address value, absolutely the same characteristic can be expected even by writing the LSB/MSB inverted values in the addresses on the occasion of presetting the values and sequentially reading these values as done in the ATM communication system according to the fourth embodiment.

In the ATM communication system in accordance with the fourth embodiment, the management of the connection management table 60 becomes troublesome to some extent, however, the process of setting the valid/invalid state data of the connection in the connection management table 60 is not normally required to be done at a comparatively high speed, and hence the LSB/MSB inverting process can be executed at a much lower speed.

[Fifth Embodiment]

Figure 13:
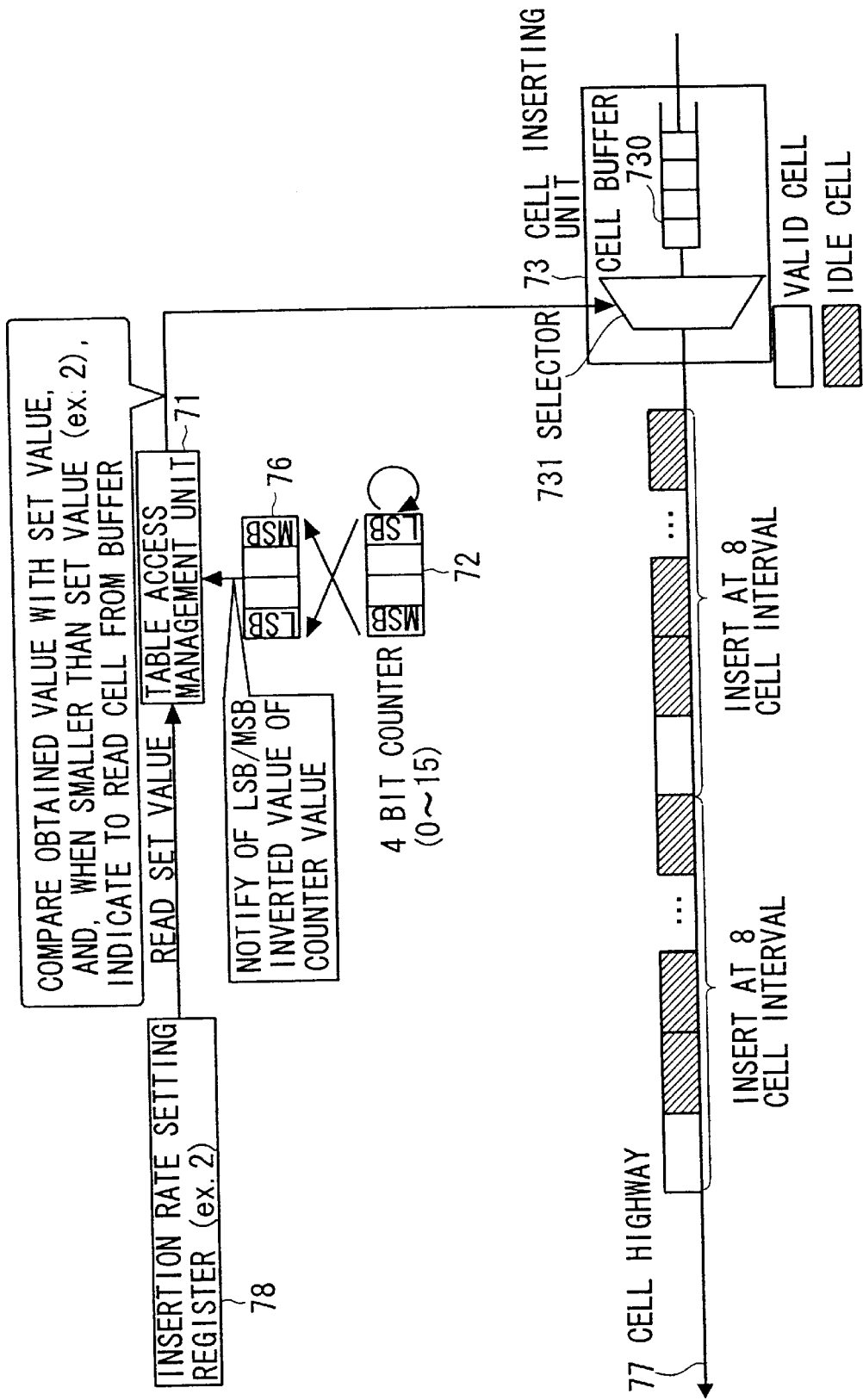
FIG. 13 is an explanatory block diagram showing an outline of architecture of the ATM communication system in a fifth embodiment of the present invention.

FIG. 13 is a block diagram showing an outline of architecture of the ATM communication system in a fifth embodiment of the present invention. Further, FIG. 14 is an explanatory block diagram showing a specific architecture and function of the ATM communication system in the fifth embodiment of the present invention.

Figure 14:
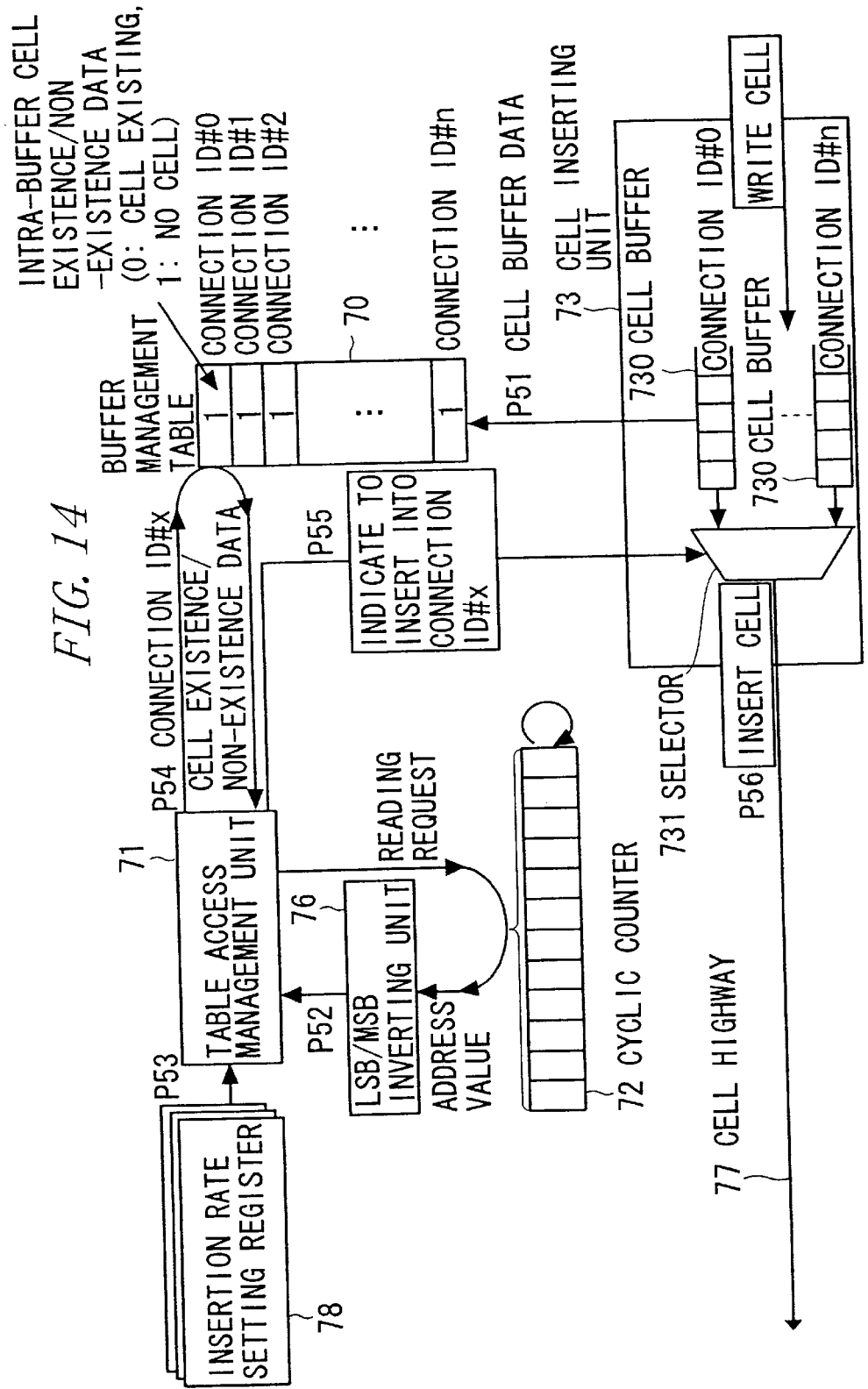
FIG. 14 is an explanatory block diagram showing a specific architecture and function of the ATM communication system in each of the fifth and sixth embodiments of the present invention.

Referring to FIGS. 3 and 14, the ATM communication system includes a buffer management table 70, a table access management unit 71, a cyclic counter 72, a cell inserting unit 73, an LSB/MSB inverting unit 76 and an insertion rate setting register 78. Note that if there are omitted explanations of the architecture and function of the ATM communication system in the fifth embodiment which will hereinafter be discussed, those are the same with the ATM communication system in each of the embodiments discussed above.

The following is what is characteristic of this ATM communication system. The cyclic counter 72 s incremented at intervals of 1-cell time, the LSB/MSB inverting unit 76 inverts LSB and MSB of the address value given from the cyclic counter 72, thereby obtaining reading interval allocation oriented sequence values. A timing when each of these reading interval allocation oriented sequence values is smaller than a value corresponding to the number of times with which the cell is inserted during one cycle set in the insertion rate setting register 78, may be set as a management-oriented cell insertion timing. At this cell insertion timing, the table access management unit 71 gives an indication to read the previously-written management-oriented cell from a cell buffer 730 of the cell inserting unit 73, and inserts this cell into a highway 77.

Accordingly, if an inverted value of the output address value of the cyclic counter 72 that is obtained by the LSB/MSB inversion falls within a range corresponding to a desired insertion rate, the cell insertion is controlled at the desired rate by allocating to the reading timing of the connection concerned. In the ATM communication system in the third embodiment, the rate for inserting the management-oriented cell is fixed, and the control concentrates on the management-oriented cell insertion interval between the respective connections. According to the ATM communication system in the fifth embodiment, however, the insertion rate setting register 78 is capable of setting a rate at which the cell should be inserted.

Further, in this ATM communication system, the inter-connection reading rates are not necessarily uniform, and there is a necessity of controlling the cell insertion in accordance with a state (of whether the cells exist or not) of the cell buffer 730 per connection. Therefore, the buffer management table 70 is used as a substitute for the connection management table, and a piece of information indicating whether there exist the management-oriented cells exist or not and data showing a buffer size may be written to the cell buffer 730 (processing step P51).

The table access management unit 71 issues the reading request to the cyclic counter 72 at intervals of the cell time, and a response address value from the cyclic counter 72 can be made invertible by the LSB/MSB inverting unit 76. The LSB/MSB inverting unit 76 notifies the table access management unit 71 of an address inverted value as an address value (a reading interval allocation oriented sequence value) (P52).

Further, the table access management unit 71 compares the received address value with a set value read from the insertion rate setting register 78 (P53). The table access management unit 71, as a result of this comparison, if the reading interval allocation oriented sequence value is smaller than the set value described above, determines a corresponding connection number ID#x, and reads, from the buffer management table 70, cell existence data (0: cell existing, 1: no cell) indicating whether or not cell buffer 730 has the cells (P54).

Based on the cell existence data, the table access management unit 71, when judging that the management-oriented cell exists, notifies the cell inserting unit 73 of the concerned connection number ID#x to be read out (P55). The cell inserting unit 73 reads the cell of the connection number ID#x concerned via a selector 731 from the cell buffer 730, and inserts the cell into the cell highway 77 (P56). At this time, the buffer management table 70 is notified of variation data about a cell buffer count, and the cell existence data in the buffer management table 70 is updated. Referring to FIG. 13, there is shown a state where the cell is inserted into the highway 77 at an 8-cell interval.

Figure 15:
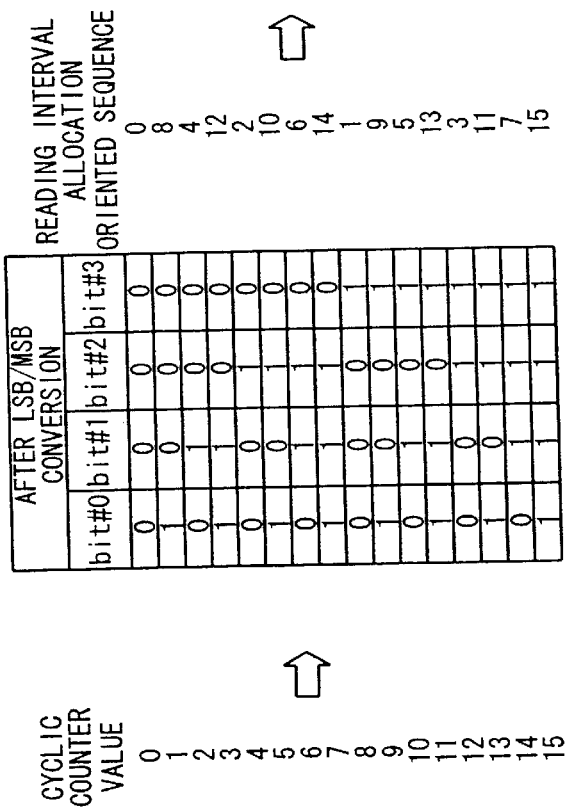
FIG. 15 is an explanatory chart showing examples of patterns of the cells to be inserted in the ATM communication system in the fifth embodiment.

FIG. 15 shows relations between the reading interval allocation oriented sequence values and insertion cell patterns. The cyclic counter 72 is incremented at intervals of 1-cell time, and LSBs and MSBs of the address values from the cyclic counter 72 are inverted, thereby the reading interval allocation oriented sequence values. Herein, a timing when the sequence value is smaller than a value corresponding to the number of times with which the cell is to be inserted during one cycle made by the cyclic counter 72, may be set as an insertion timing, and the management-oriented cell is inserted at this insertion timing. FIG. 15 shows the insertion cell patterns when the insertion rates are $1/16$, $4/16$ and $8/16$. The cells are inserted at the 8-cell, 4-cell and 2-cell intervals corresponding to the respective insertion rates.

In the ATM communication system according to the fifth embodiment discussed above, the cell is inserted when each of the reading interval allocation oriented sequence values obtained by inverting LSBs and MSBs of the cyclic counter values, is the predetermined value, whereby the cell can be readily inserted at the desired rate.

There might be a case where a fluctuation in cell delay becomes larger than by the above method of managing the cell insertion intervals with the plurality of cyclic counters for every logic path and inserting the cell at the desired rate, however, the management thereof can be actualized by on single cyclic counter, and it is therefore feasible to reduce both of the quantity of the hardware and the process of controlling a conflict between the plurality of counters.

Further, without making use of the LSB/MSB inversion, if the timing when the cyclic counter shows a given value is set as the cell transfer timing, this needs the table for storing the cyclic counter values corresponding the respective cell transfer timings. According to the method in the fifth embodiment, however, what is required above can be attained simply by the comparison in magnitude with the threshold value set in the insertion rate setting register 78, with the result that the quantity of the hardware can be decreased.

Note that the cell buffer 730 of the cell inserting unit 73 and the buffer management table 70 are managed not for each of the connections ID#0 . . . ID#n but for every physical transmission path and quality class, and the cell insertion rate may also be controlled per transmission path and quality class.

[Sixth Embodiment]

Figure 16:
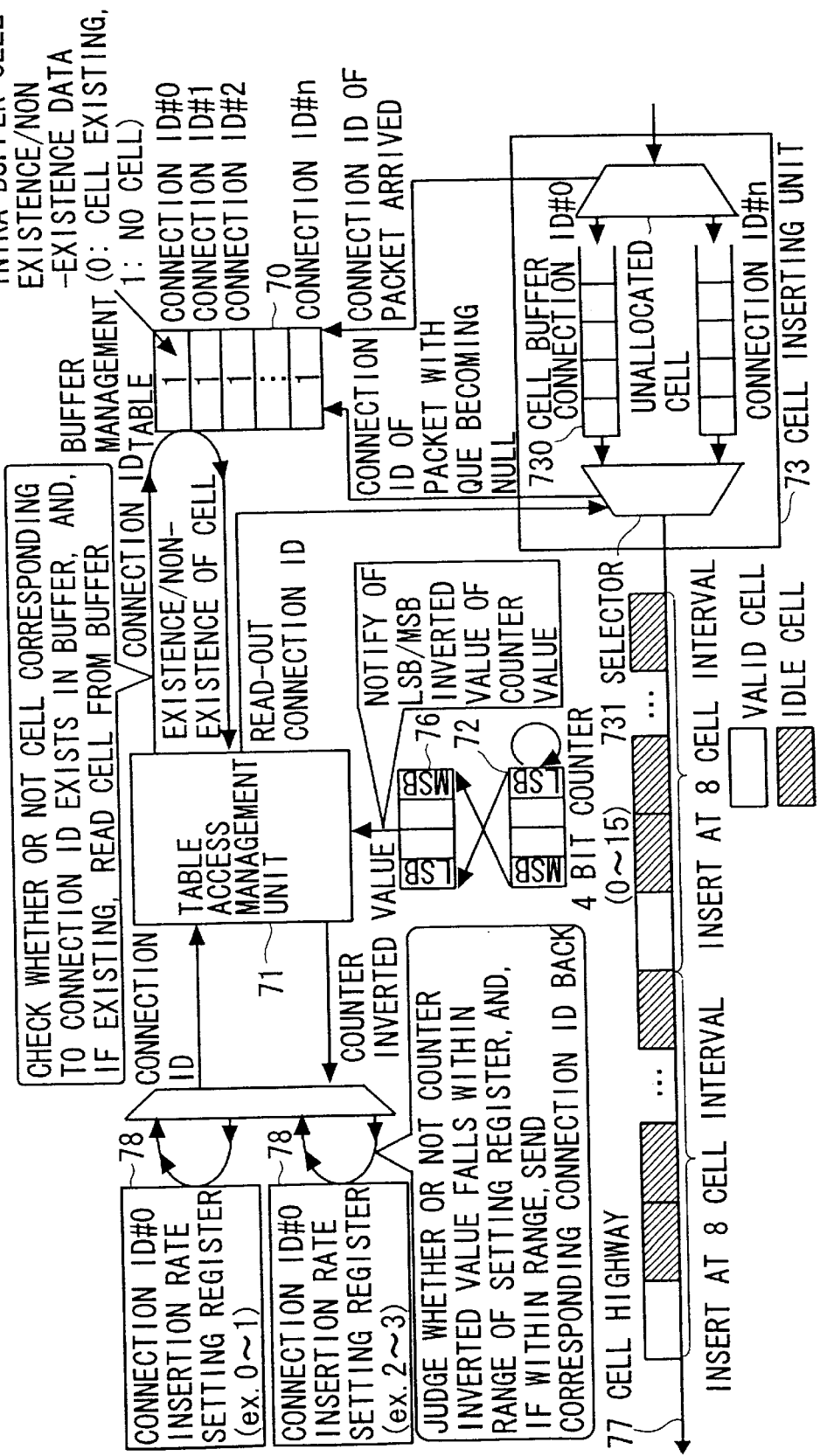
FIG. 16 is an explanatory block diagram showing an outline of architecture of the ATM communication system in a sixth embodiment of the present invention.

FIG. 16 is a block diagram showing a sixth embodiment of the present invention. The specific architecture and function of this ATM communication system are basically the same as those of the ATM communication system in the fifth embodiment demonstrated in FIG. 14, and therefore the following discussion will be focused on different configurations and functions therebetween.

Referring to FIGS. 14 and 16, what is characteristic of this ATM communication system is that there is allocated a range of values corresponding to the number of times with which to read, within one cycle of the cyclic counter per connection, the reading interval allocation oriented sequence values corresponding to the inverted values obtained by inverting LSBs and MSBs of the counter values of the cyclic counter 72, and, when the reading interval allocation oriented sequence value falls within the allocated range, the cell of the connection corresponding thereto is inserted.

To describe it in greater details, the range of the values corresponding to the number of times with which to read the reading interval allocation oriented sequence values within one cycle of the cyclic counter per connection, is allocated and set in the insertion rate setting register 78 per connection. If the reading interval allocation oriented sequence value falls within the range allocated, when the cell arrives at the cell buffer 730, the cell existence data of the cell subjected to buffering per connection is read from the buffer management table 70 stored beforehand with these pieces of cell existence data, and it is checked whether or not the cell of the connection concerned receives buffering.

At this time, if the cell to be read undergoes buffering, the cell inserting unit 73 is indicated to insert the cell into the highway 77. Further, there is no cell that undergoes buffering with respect to a certain connection, the cell existence data written to the buffer management table 70 is changed to [1] representing the state of having no cell.

Figure 17:
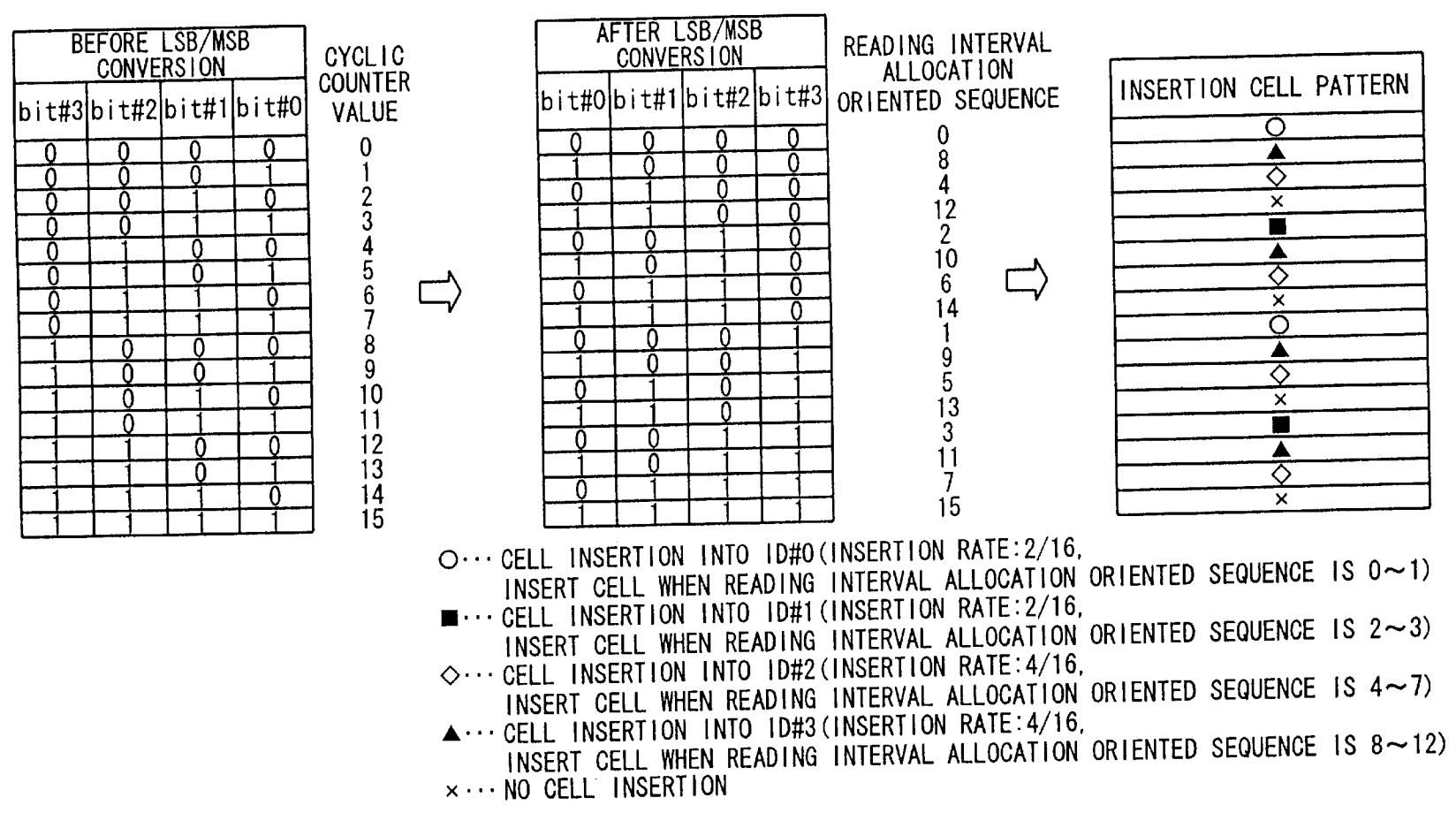

FIG. 17 shows relation between the reading interval allocation oriented sequence values and the insertion cell patterns. In this example, the cells are inserted at rates of 2/16, 2/16, 4/16 and 5/16 with respect to the connections ID#0, ID#1, ID#2 and ID#3.

The following is a mode of allocation for the cell insertion. When the reading interval allocation oriented sequence values obtained by inverting LSBs and MSBs of the cyclic counter values are 0~1, the cell of the connection ID#0 is inserted. When being 2~3, the cell of the connection ID#1 is inserted. When being 4~7, the cell of the connection ID#2 is inserted. When being 8~12, the cell of the connection ID#3 is inserted. The cell insertion rate for each connection can be thereby controlled.

In the case of executing the LSB/MSB inversion, it is required for obtaining all the inverted values that the cycle should continue till the bits of the cyclic counter 72 become all [0] and all [1]. Herein, a circuit speed of 600 Mbps is equivalent to a speed at which 1440000 cells (1 cell=53 bytes×8 bits/s) are transferred for one second, and a cell rate such as 1 cell/sec corresponds to a process in which the cell is inserted once for 1440000 cells.

On the other hand, a cell transfer rate declared on signaling is declared at every 1 cell/sec, and therefore a counter cycle of the cyclic counter 72 is set to 1440000. Thus, the declared transfer rate is made corresponding to the number of cells transferred during one cycle made by the cyclic counter 72, whereby the cell can be inserted in accordance with the declared transfer rate.

In the ATM communication system according to the sixth embodiment discussed above, the reading interval allocation oriented sequence values obtained by inverting LSBs and MSBs of the cyclic counter values, are delimited at given intervals and allocated to the plurality of connections, whereby the cells of the plurality of connections can be inserted at the desired rate.

When the cells of the plurality of connections are inserted at the desired rate, the prior art system involves providing the individual counter for managing the cell insertion interval for every connection, and the cell insertion request is issued at the timing when each counter comes to its expiration. If the insertion requests from the respective connections conflict with each other, this conflict is controlled in such a way that the cell insertion is carried out for any one of the connections, and the cell insertion requests given from other connections must be waited.

In the ATM communication system in accordance with the sixth embodiment, though the fluctuation in the cell interval might be larger than by the prior art system, neither the cell insertion interval management oriented counter for every connection nor the conflict control, is needed. The system can therefore be actualized with a much simpler hardware architecture.

[Seventh Embodiment]

FIG. 18 is an explanatory block diagram showing an outline of configuration and function of the cyclic counter in the ATM communication system in a seventh embodiment of the present invention. Further, FIG. 19 is an explanatory block diagram showing a specific configuration and function of the cyclic counter in the ATM communication system in the seventh embodiment of the present invention. The ATM communication system in the seventh embodiment takes other configuration of the cyclic counter in the ATM communication system in each of the fifth and sixth embodiments discussed above. Note that if there are omitted explanations of the architecture and function of the ATM communication system in the seventh embodiment which will hereinafter be discussed, those are the same with the ATM communication system in the fifth or sixth embodiment.

The following is a characteristic of this ATM communication system. If a resolution of the reading rate is not coincident with a power of 2, when trying to set a cycle of a cyclic counter 80 to, e.g., 1440000, 1440000 is prime-factorized. Then, it is expressed by a product of each prime factor an replaced with an aggregation of the counters each making a cycle with a period of each prime factor, and a high-order digit and a low-order digit are inverted, thereby obtaining reading interval allocation oriented sequence values.

As shown in FIG. 18, in the case of constructing the cyclic counter 80 of which a cycle is 1440000, the cyclic counter is constructed of an aggregation of cyclic counters 81, 82, 83 defined as prime factors obtained by performing the prime-factorization of 1440000. Since 1440000 is prime-factorized into $2^7 \times 3^2 \times 5^3$, the cyclic counter 80 is constructed of the aggregation of the binary cyclic counter 81 of 7 digits, the ternary cyclic counter 82 of 2 digits and the quinary cyclic counter 83 of 3 digits. Further, digit inverted values obtained by inverting the high- and low-order digits of the cyclic counter 80 as in the case of the LSB/MSB inversion, are set as the reading interval allocation oriented sequence values, whereby the cell can be inserted at a desired rate.

FIG. 19 shows a cyclic counter configuring example 1 as one of examples of configuring the 1440000 cyclic counter 80. In this counter configuring example 1, the cyclic counter 80 is constructed of the binary cyclic counter 81 of 7 digits, the ternary cyclic counter 82 of 2 digits and the quinary cyclic counter 83 of 3 digits. When each cyclic counter makes one cycle, the cyclic counter of the higher-order digit is notified of carry data (+1) and is incremented by 1.

Herein, the order in which the cyclic counters are arranged may also be different. Further, the cyclic counter may be constructed, as in a cyclic counter configuring example 2, not of the counters of complete prime factors but of the counters of which only some are prime-factor counters. In the configuring example 2, a decimal cyclic counter 84 of 3 digits is not classified as a prime-factor counter.

Figure 20:
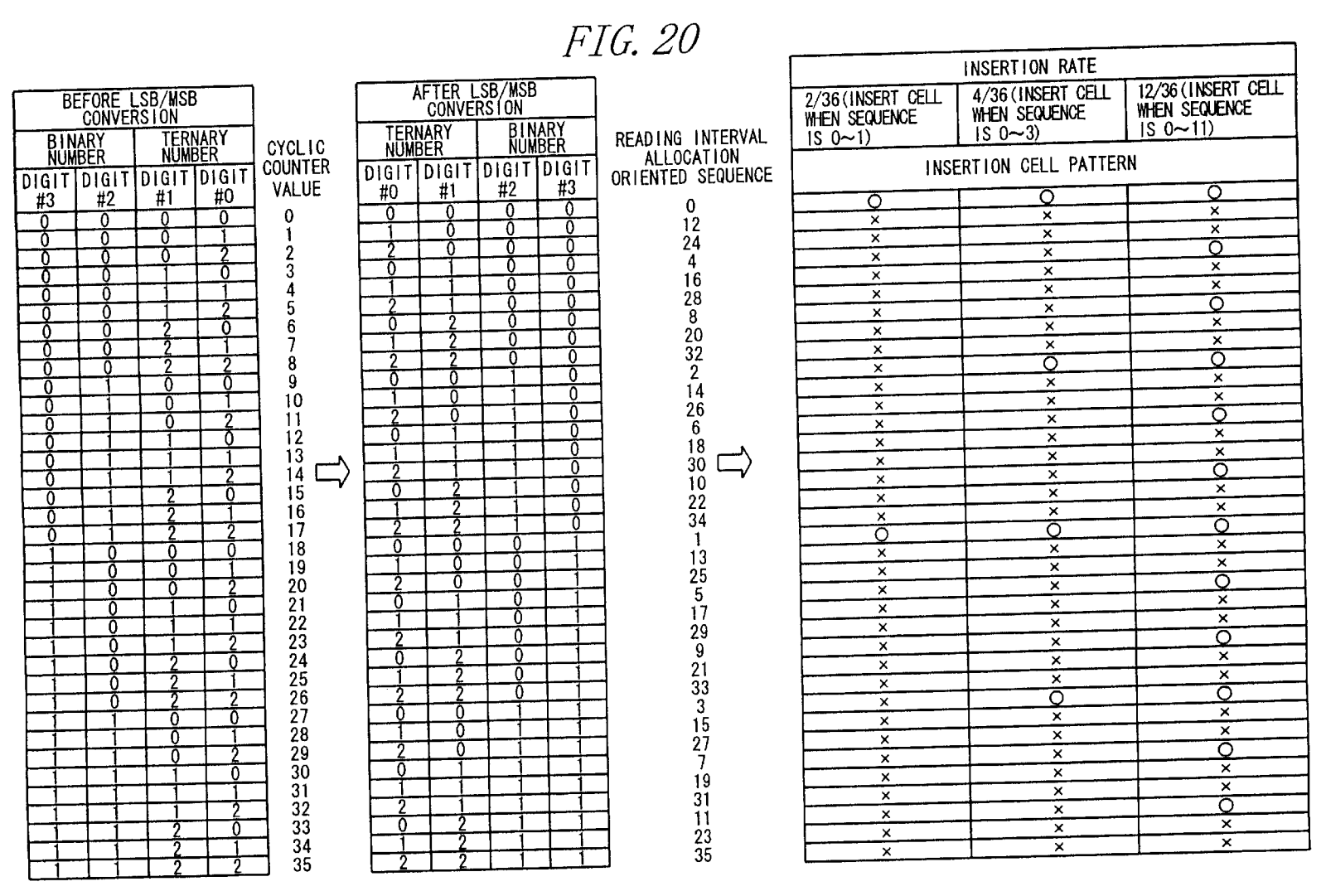

FIG. 20 shows relations between the reading interval allocation oriented sequence values and the insertion cell patterns. This example exemplifies a case where the cycle is 36. Since 36 is expressed by $2^2 \times 3^3$, the cyclic counter 80 may be constructed of an aggregation of the binary cyclic counter of 2 digits and the ternary cyclic counter of 2 digits. Then, as in the case of the LSB/MSB inversion, the reading interval allocation oriented sequence taking discrete values is obtained by inverting the high- and low-order digits. A timing when the reading interval allocation oriented sequence value falls within a range corresponding to a desired rate, is set as a cell insertion timing, and the cell can be inserted at the desired rate at this timing.

In the ATM communication system in the seventh embodiment, as in the ATM communication system according to the second or third or fourth embodiment, when the management-oriented cell insertion interval is set corresponding to the number of connections in use, it is desired that the numbers from the smallest or largest number be consecutively used as a value of the in-use connection number and a value of the unused connection number.

In an initial state, if the connection is registered at first, the use of the number starts from the smallest or largest, and hence, though the in-use and unused connection numbers are consecutive, if the connection is cut off, the connection number thereof is not necessarily the largest. Therefore, the in-use and unused connection numbers lose their continuity. Accordingly, it is desired for keeping the continuity that the smallest or largest number among the unused connection numbers be searched and used when registering a new connection.

[Eighth Embodiment]

Figure 21:
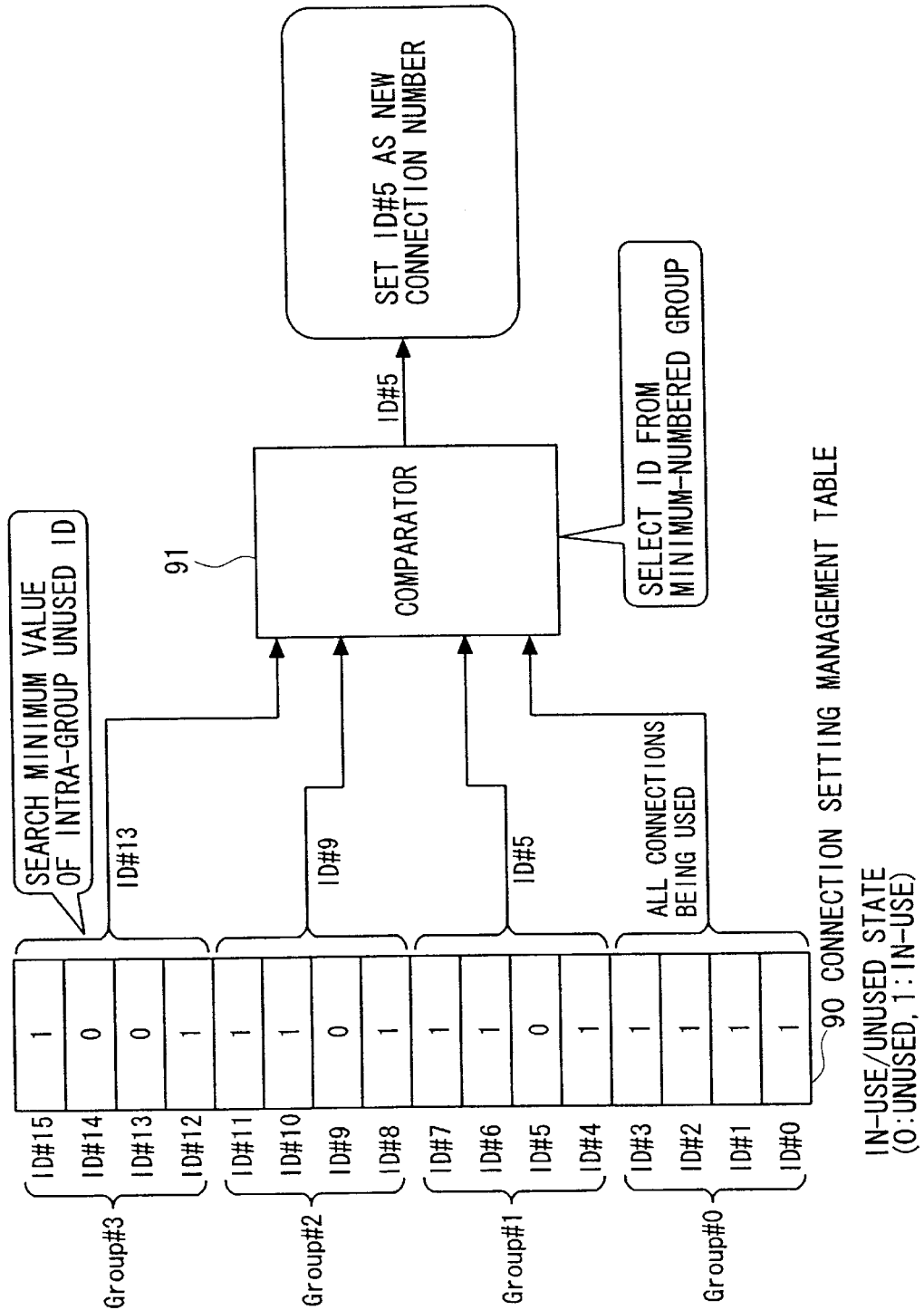
FIG. 21 is an explanatory block diagram showing an outline of architecture and operation of a method of setting (registering) a connection number in a connection management table in the ATM communication system in an eighth embodiment of the present invention.
Figure 22:
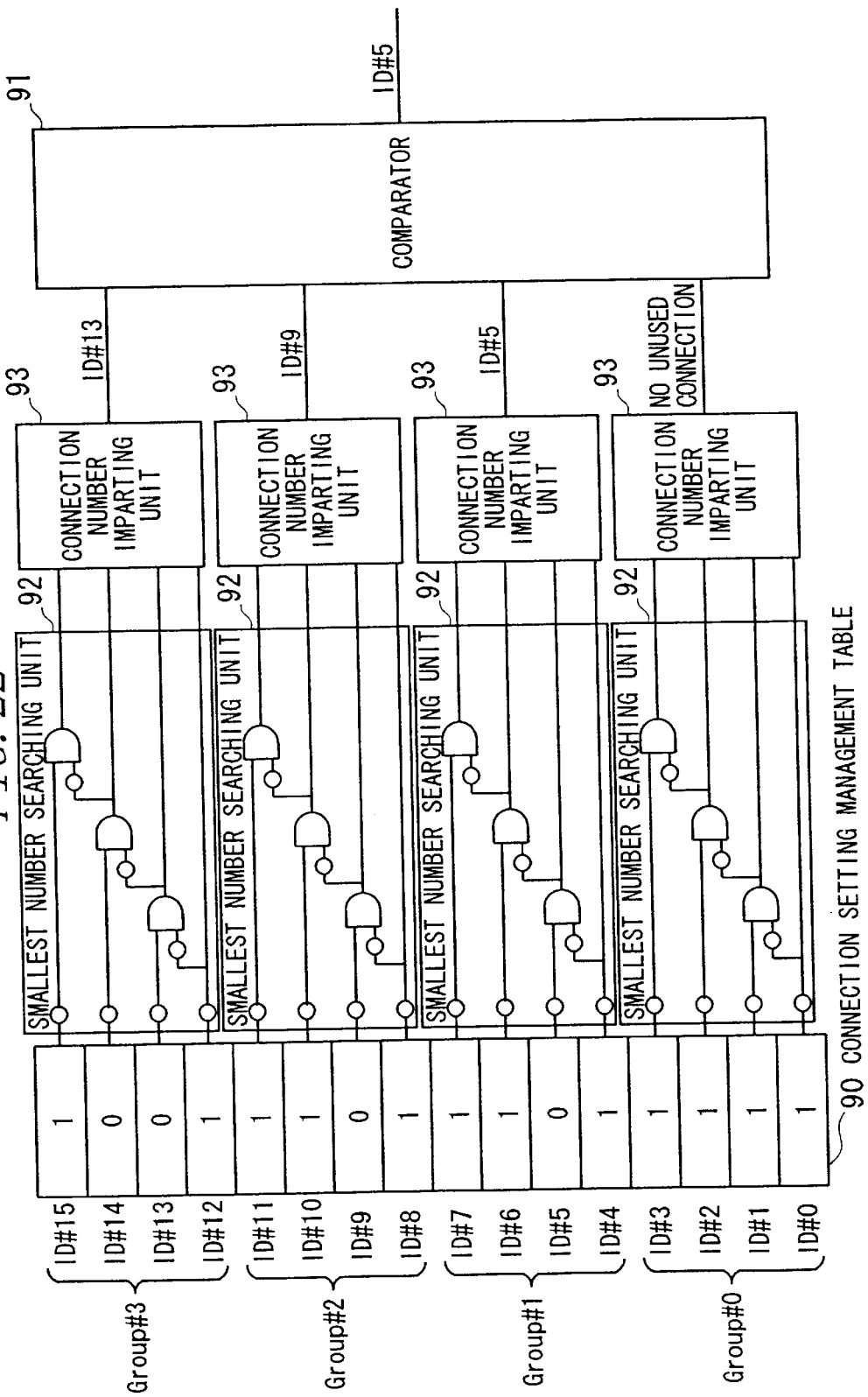
FIG. 22 is an explanatory block diagram showing a specific architecture and operation of the method of setting (registering) the connection number in the connection management table in the ATM communication system in the eighth embodiment of the present invention.

FIG. 21 is an explanatory block diagram showing an outline of architecture and function of a method of setting (registering) the connection number in the connection management table in the ATM communication system in an eighth embodiment of the present invention. Further, FIG. 22 is an explanatory block diagram showing a specific architecture and function of the method of setting (registering) the connection number in the connection management table in the ATM communication system in the eighth embodiment of the present invention.

In this ATM communication system, as shown in FIG. 21, when the connections are newly registered in one of the above connection management tables 30, 40, 50 and 60, the connections are sorted into some groups, and the smallest number among the unused connection numbers is searched. Moreover, the smallest number of the smallest-numbered group among all the groups is set as the smallest number of the whole and is used as a connection number when a new connection is registered in the connection management table.

When searching the smallest number from a connection setting management table 90 for managing the in-use/unused state data (in-use state: 1, unused state: 0) of the connection numbers, the connection numbers are sorted into groups Group#0 . . . Group#3, and the smallest numbers ID#5, ID#9, ID13 of these groups are searched. Further, the smallest connection number (ID value) of the smallest-numbered group among those groups is selected by a comparator 91 and set to be the smallest number ID#5.

The connection numbers are sorted into the groups, and the smallest number in each group is searched, whereby the searching processes can be executed in parallel and a processing speed therefore increases. Further, if structured as shown in FIG. 21, the requirement may be to distinguish between only bits #0~#1 in Group #0, bits #2~#3 in Group #1, bits #4~#5 in Group #2 and bits #6~#7 in Group #3, so that the quantity of the hardware of the searching unit can be reduced.

FIG. 22 shows a specific example. Referring to FIG. 22, when setting the connections ID#0 . . . ID#15 in the connection setting management table 90, logic signals [1] representing that the connection is being used, are written to addresses of corresponding connection numbers. When canceling the connection, a logic signal [0] representing that the connection is unused, is written to the address of the corresponding connection number.

If requested to newly set a connection, a smallest number searching unit 92 outputs the signal [1] to a connection number imparting unit 93 with respect to only the smallest-numbered connections among the unused connections exhibiting the state data [0] in the respective groups in the connection setting management table 90.

Th connection number imparting unit 93 outputs the connection number to the comparator 91 in a way of making the signal [1] being outputted and the connection number corresponding to each other. Supposing that there is no signal [1: being outputted, the connection number imparting unit 93 notifies the comparator 91 that all the connections in the group concerned are being used by outputting a signal indicating that there is no unused connection.

The comparator 91 notifies the connection management table of the connection number ID#5 as a new connection number outputted from the smallest-numbered group Group #1 among the respective groups excluding those of the unused connections. On this occasion, the value [0] is set to the concerned connection as the unused connection in the connection setting management table 90.

[Ninth Embodiment]

Figure 23:
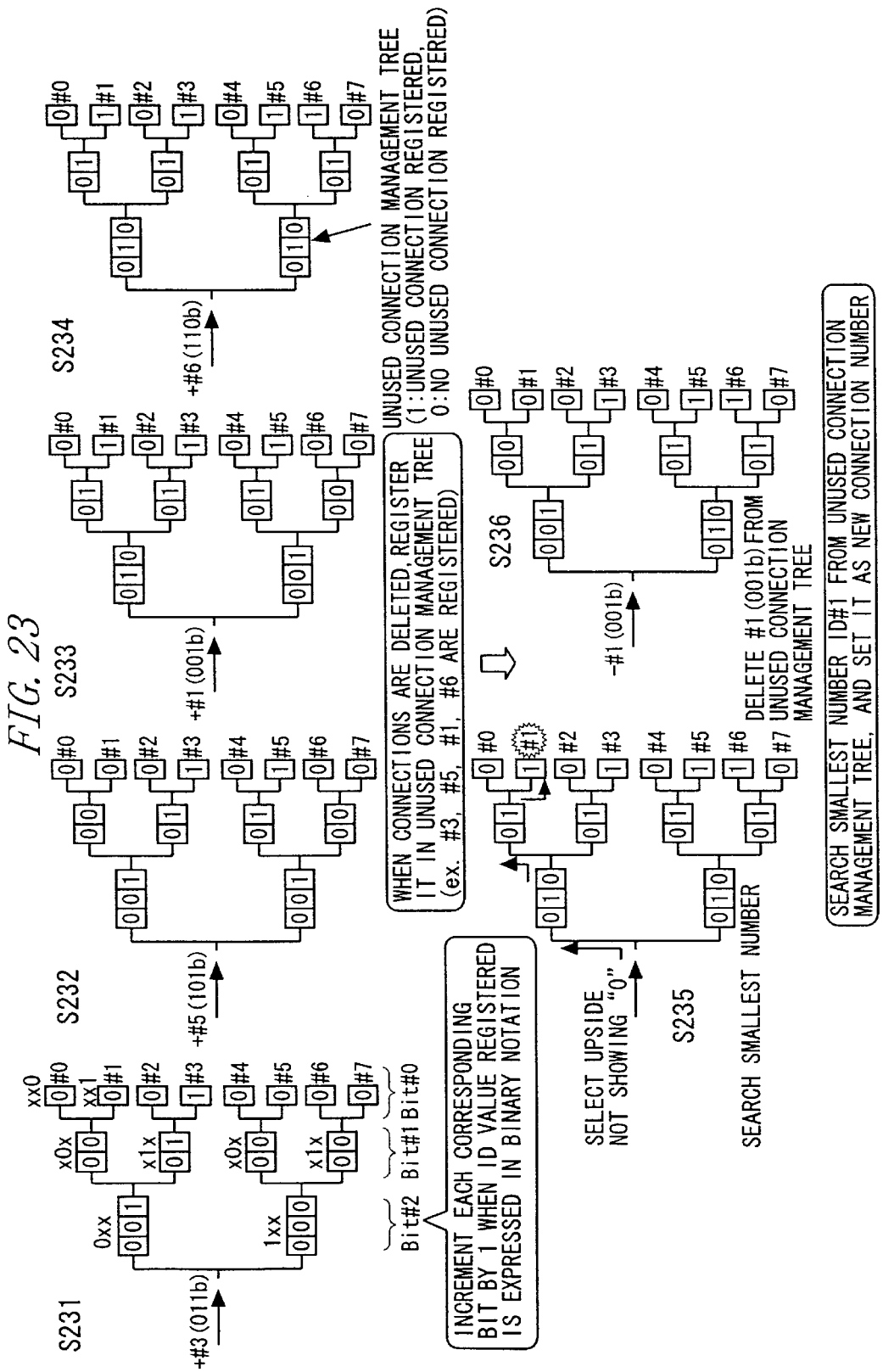
FIG. 23 is an explanatory block diagram showing an architecture and operation of the method of setting (registering and deleting) the connection number in the connection management table in the ATM communication system in a ninth embodiment of the present invention.
Figure 24:
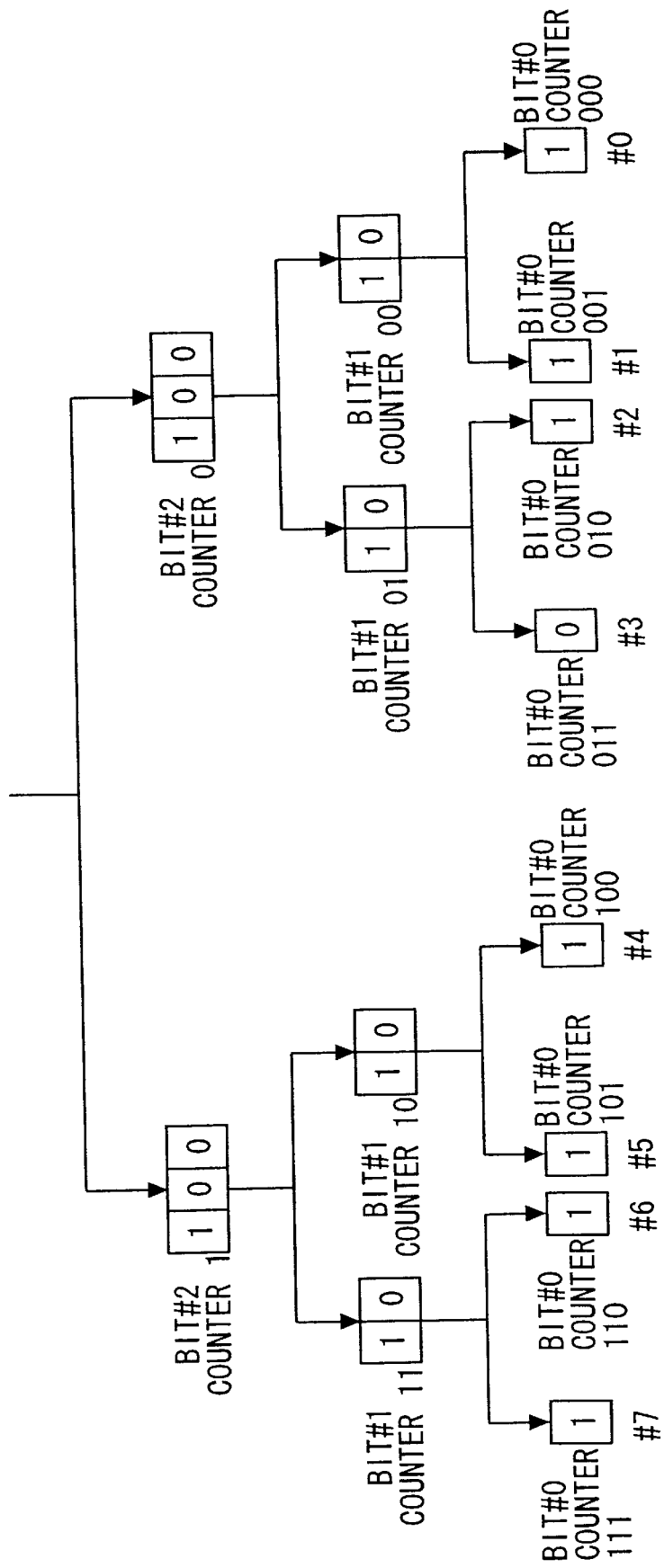
FIG. 24 is an explanatory block diagram showing the architecture and operation of the method of setting (registering and deleting) the connection number in the connection management table in the ATM communication system in a ninth embodiment of the present invention.

FIGS. 23 and 24 are explanatory block diagrams showing an architecture and function of a method of setting (registering and deleting) the connection numbers in the connection management table in the ATM communication system in a ninth embodiment of the present invention.

According to this ATM communication system, as shown in FIG. 23, in the case of sorting out the connection numbers by respective bit values when expressed by the power of 2, there is configured an unused connection management tree for managing the number of the unused connections having the same bits down from a higher-order bit. What is characteristic herein is that when deleting the connection, its connection number is registered in the unused connection management tree, and, when registering a new connection, the smallest number is obtained by searching from the unused connection management tree and is set as a connection number thereof.

If the connection is cut off, its connection number is written to the unused connection management tree. For instance, when the unused connection number to be registered in the unused connection management tree is #3 (011b), an 0xx counter of bit #2 in the tree is incremented by 1. Next, an x1x counter of bit #1 in the tree is incremented by 1. Finally, an xx1 counter of bit #0 in the tree is incremented by 1. The same process is executed with respect to other unused connections ID.

When setting the new connection, the search from the high-order bit down to the low-order bit in the unused connection management tree is carried out while selecting the higher (smaller numbers) among those that do not exhibit the counter value [0] in respective hierarchical portions, thereby obtaining the smallest number from the unused connection management tree. Based on this, let N be the number of connections, and $\log_2 N+1$ (four times= $\log_2 8+1$ in the example in FIG. 23) may be enough as the number of searches, with the result that very fast searching can be done.

FIG. 24 shows an example in which the number of connections is [8]. If [8] is expressed in a binary notation, it is given by 3 bits. Hence, 3-staged bit counters such as two pieces 3-bit counters, four pieces ($=2^2$) of 2-bit counters and 8 pieces ($=2^3$) of 1-bit counters, are connected in tree. The reason why the numbers of bits of the higher two counters, the intermediate four counters and the lower eight counters are 3 bits, 2 bits and 1 bit, is that the maximum values of the number of subordinate connections thereof are 4, 2 and 1, and hence these values are made countable.

Figure 25:
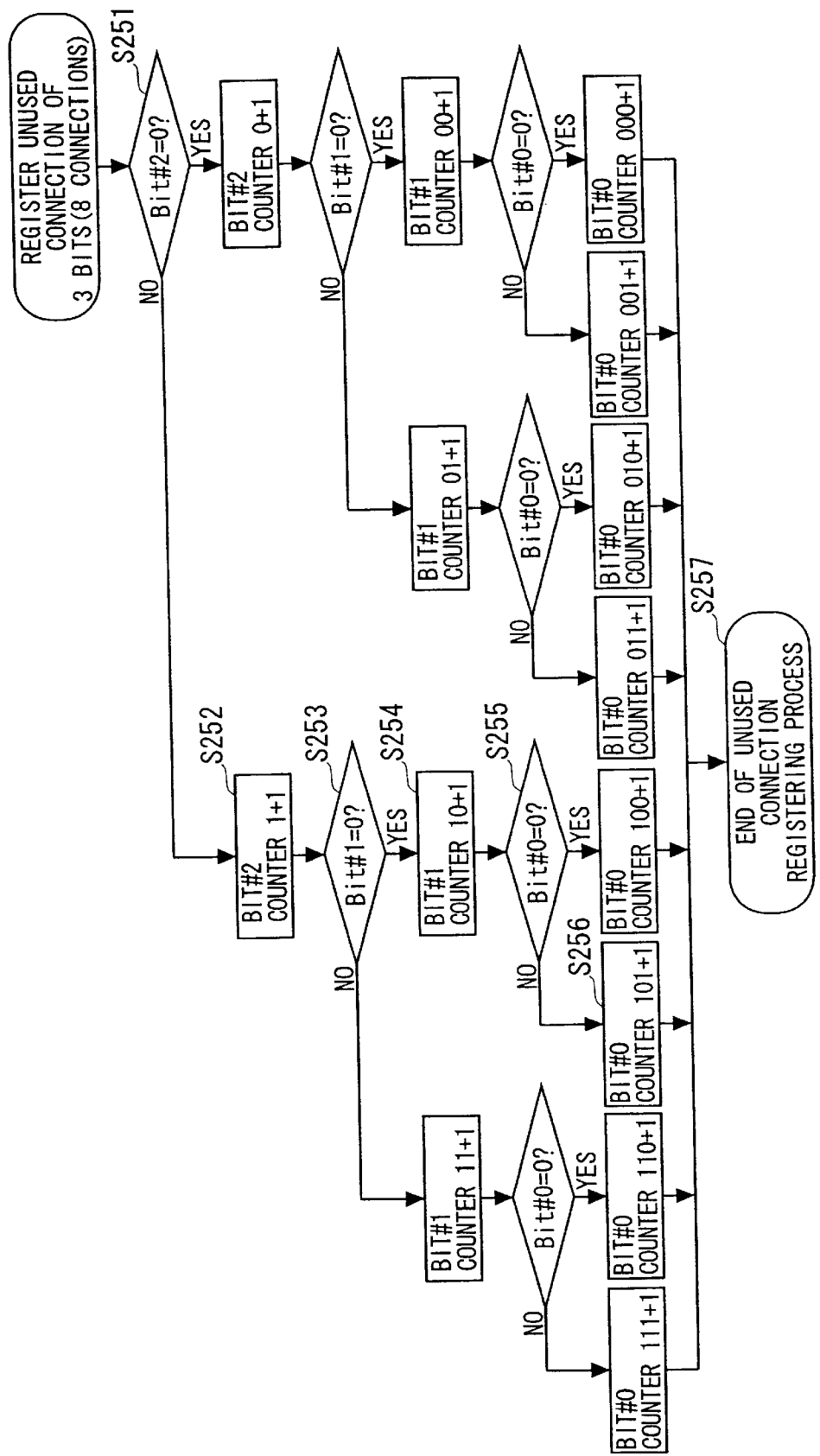
FIG. 25 is a flowchart showing processes when registering an unused connection in the ATM communication system in the ninth embodiment of the present invention.

FIG. 25 is a flowchart showing processes when registering the unused connection. Each bit counter value is incremented by 1 based on the respective corresponding bit values when the connection number of the connection concerned is expressed in the binary notation. Each bit counter is capable of counting the number of unused connections as subordinate connections by processing described above.

For example, when the connection number #5 (101b) is registered in the unused connection management tree (which corresponds to S232 in FIG. 23), Bit #2 of the connection number #5 is [1], and therefore the judgement is No in judgement process S251. Then, 1 is added to the value of the Bit #2 counter (step S252). Next, in judgement process S253, Bit#1 is [0], and hence the judgement is Yes. Then, [1] is added to the value of the Bit #1 counter 10 (S254). Further, in judgement process S255, the Bit #0 is [1], so that the judgement is No. Then, 1 is added to the Bit #0 counter 101 (S256), and the unused connection registering process comes to an end (S257). Note that the same processes may be executed when other connection numbers are registered in the unused connection management tree.

Figure 26:
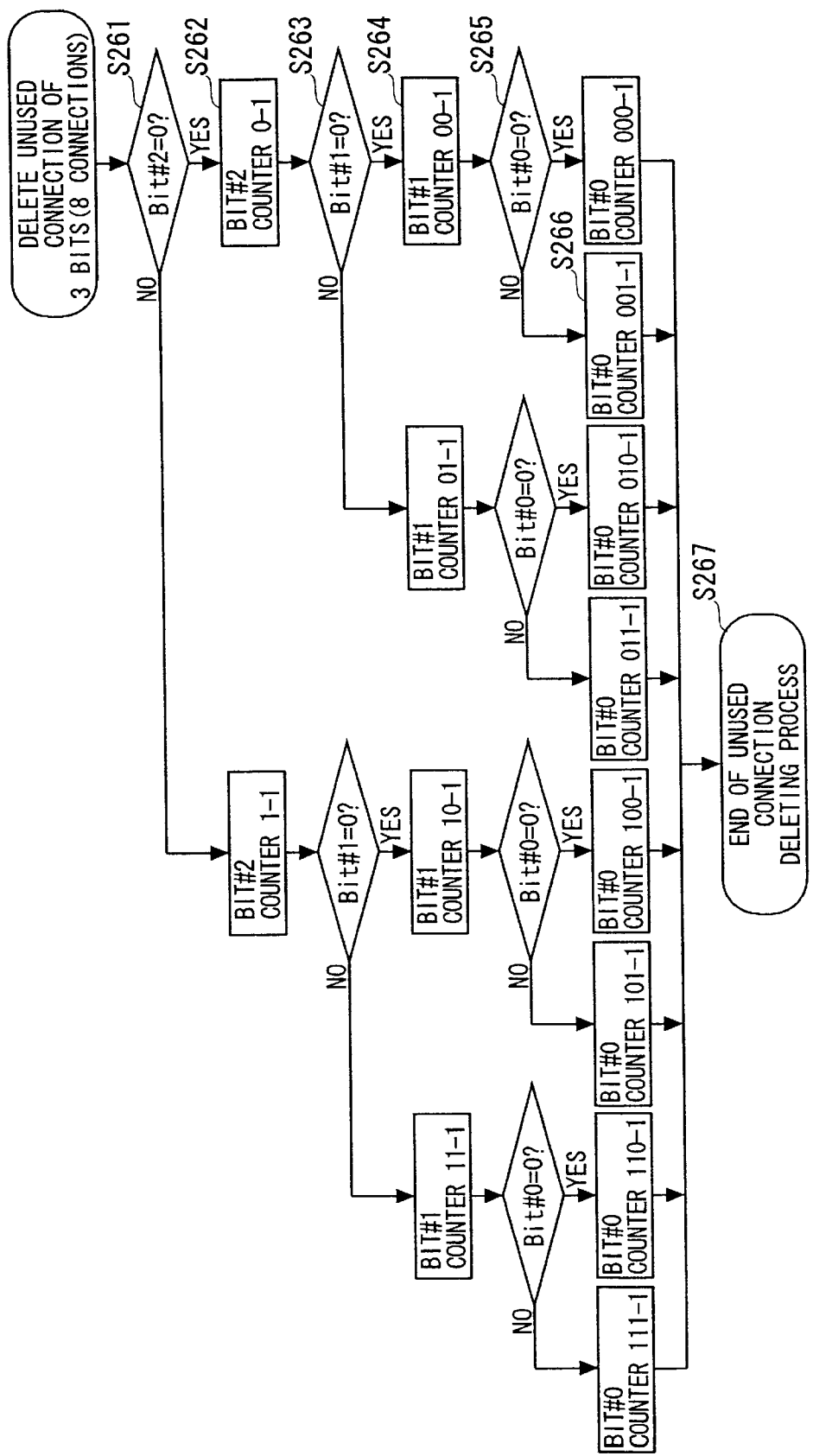
FIG. 26 is a flowchart showing processes when deleting the unused connection in the ATM communication system in the ninth embodiment of the present invention.

FIG. 26 is a flowchart showing processes when deleting the unused connection. Reversely when registered, each bit counter value is decremented by 1 based on the corresponding bit value when the connection number of the connection concerned is expressed in the binary notation.

For example, when the connection number #1 (001b) is deleted from the unused connection management tree (which corresponds to S236 in FIG. 23), Bit #2 of the connection number #1 is [0], and therefore the judgement is Yes in judgement process S261. Then, 1 is subtracted from the value of the Bit #2 counter 0 (step S262). Next, in judgement process S263, Bit #1 is [0], and hence the judgement is Yes. Then, [1] is subtracted from the value of the Bit #1 counter 00 (S264). Further, in judgement process S265, the Bit #0 is [1], so that the judgement is No. Then, the Bit #0 counter 001 is decremented by 1 (S266), and the unused connection deleting process comes to an end (S267).

Note that the same processes may be executed when other connection numbers are deleted from the unused connection management tree.

Figure 27:
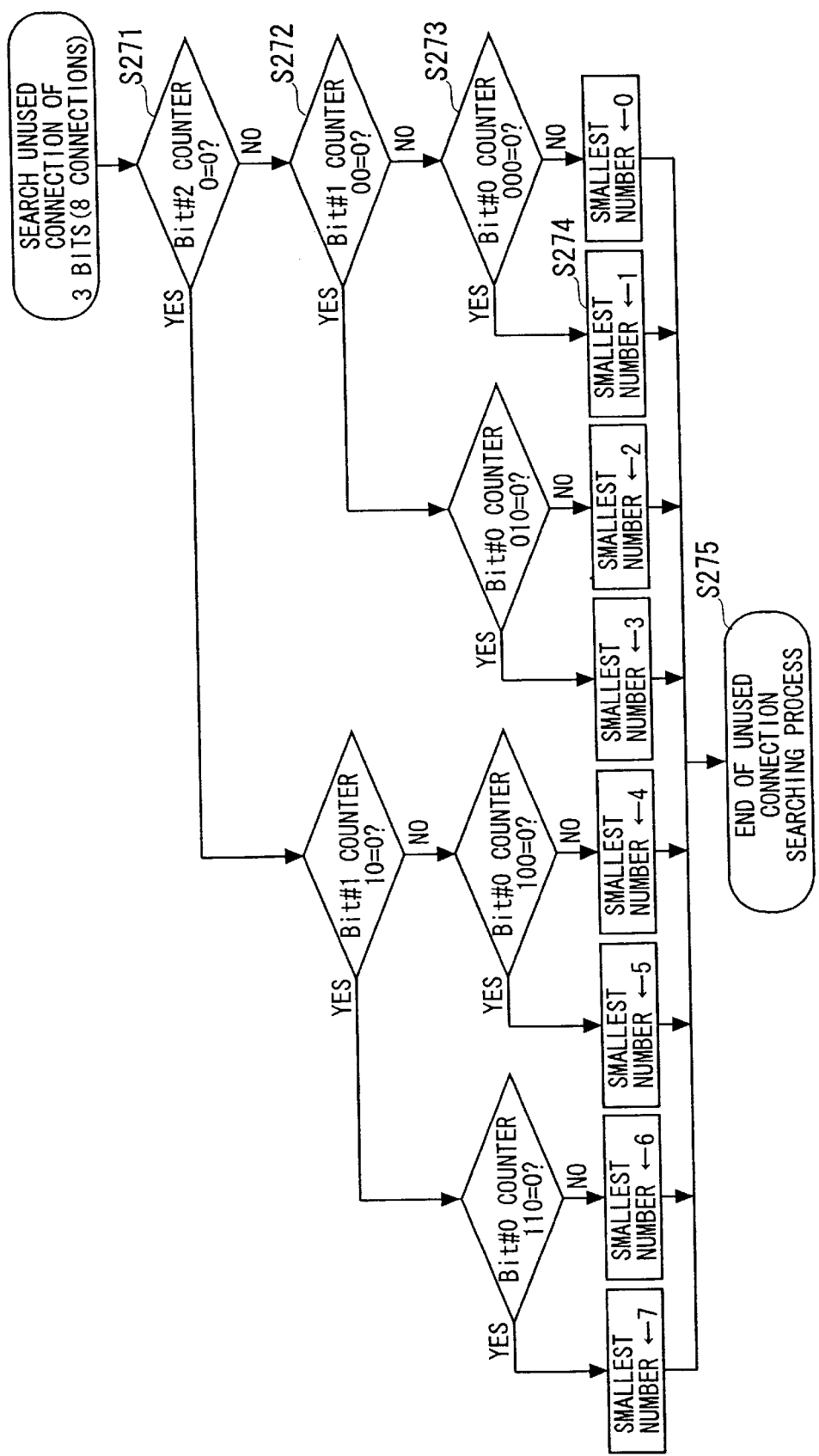
FIG. 27 is a flowchart showing processes when searching the unused connection in the ATM communication system in the ninth embodiment of the present invention.

FIG. 27 is a flowchart showing processes when searching the unused connection. When searching the smallest number of the unused connection, the numbers are searched from the higher-ordered, i.e., smaller-numbered counter. To start with, it is checked whether the bit #2 counter 0 is [0] or not. If not [0], the bit #1 counter 00 subordinate to this bit #2 counter 0 is checked. If it is [01], the smallest number is set to [0], and if being [1], the smallest number is set to [1].

Thus, the smallest number can be obtained with a small number of searches by searching the unused connection management tree. When both of the bit #2 counter 0 and the bit #2 counter 1 are [0], this implies that all the connection numbers show being used, and hence there is no corresponding smallest number.

For instance, in a case where the connection numbers #6, #5, #3 and #1 are registered in the unused connection management tree and the smallest number is searched (which corresponds to S235 in FIG. 23), [10b] is counted in the Bit #2 counter 0, [10b] is counted in the Bit #2 counter 1, and [10b] is counted in the Bit #2 counter 0. Further, [01b] is counted in the Bit #1 counter 00, [01b] is counted in the Bit #1 counter 01, [01b] is counted in the Bit #1 counter 10, and [01b] is counted in the Bit #1 counter 11. Moreover, [0b] is counted in the Bit #0 counter 000, [0b] is counted in the Bit#0 counter 001, and [0b] is counted in the Bit #0 counter 010. [0b] is counted in the Bit #0 counter 100, [1b] is counted in the Bit #0 counter 101, [1b] is counted in the Bit #0 counter 110, and [0b] is counted in the Bit #0 counter 111.

In this state, since the Bit #2 counter 0 is [10b], the judgement is No in judgement process S271. Next, the Bit #1 counter 00 is [01b], and therefore the judgement is No in judgement process S272. Further, because of the Bit #0 counter 000 being [0], the judgement is Yes in judgement process S273, and the smallest number 1 is selected (S274). Then, the smallest number searching process of the unused connection is finished (S275). Note that the same process may be executed also when searching other smallest numbers.

In the ATM communication system according to the ninth embodiment discussed above, on the occasion of registering or deleting the connection, each bit counter value is incremented by 1 in the case of registering the connection but is decremented by 1 in the case of deleting the connection on the basis of each corresponding bit value when the connection number of the connection concerned is expressed in the binary notation. With this processing, each of the bit counters is capable of counting the number of the unused connections linked as the subordinates.

Herein, in the initial state where all the connections are unused, the counter value corresponding to the state in which all the connection have been registered may be previously written. Further, when allocating the connection numbers at first, the connection numbers are separately managed in the order of the smaller numbers, and only the connection numbers of the connections that have been disconnected and brought into the unused state, are managed based on the management tree. Moreover, each counter may be constructed not of the binary counter but of a decimal counter or other n-ary counter.

According to the smallest number searching method, when in the searching process, the largest number may also be searched by making comparisons starting from larger numbers. Further, this method may be applied, in addition to the search of the connection number, to the search of a sequence of numbers such as searching a quality class number and so on. Furthermore, the unused connection may be deleted by decrementing the counter simultaneously when searching the unused connection.

[Modified Examples]

The embodiments of the present invention discussed above have dealt with the packet insertion interval control by exemplifying the ATM communication system for inserting the fixed-length packet as the cells into the connection. The present invention can be, however, embodied in other packet switches such as a router, etc. The connection may be treated as a unit for the packet management in a data flow etc.

Further, in the cell inserting unit, the variable length packet is handled as the plurality of cells, connection ID inserting indications or read-out connections ID are accumulated, and, when a sum of the accumulations exceeds the variable length packet size, the variable length packet is inserted, whereby the packet may take a variable-length form on the transmission path. This will be explained in depth referring to FIGS. 28 and 29.

Figure 28:
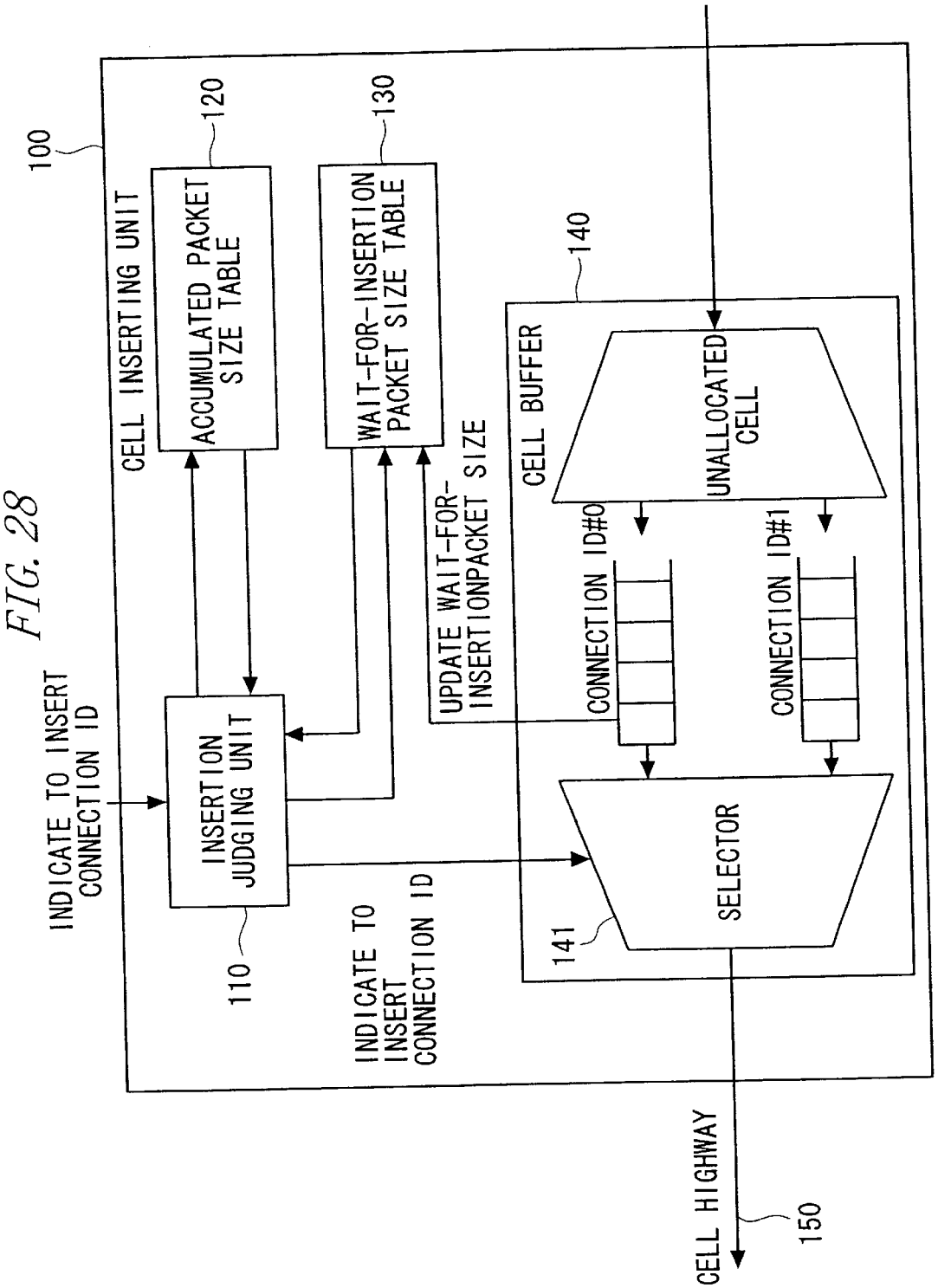
FIG. 28 is a block diagram showing an modified example of the ATM communication system of the present invention.
Figure 29:
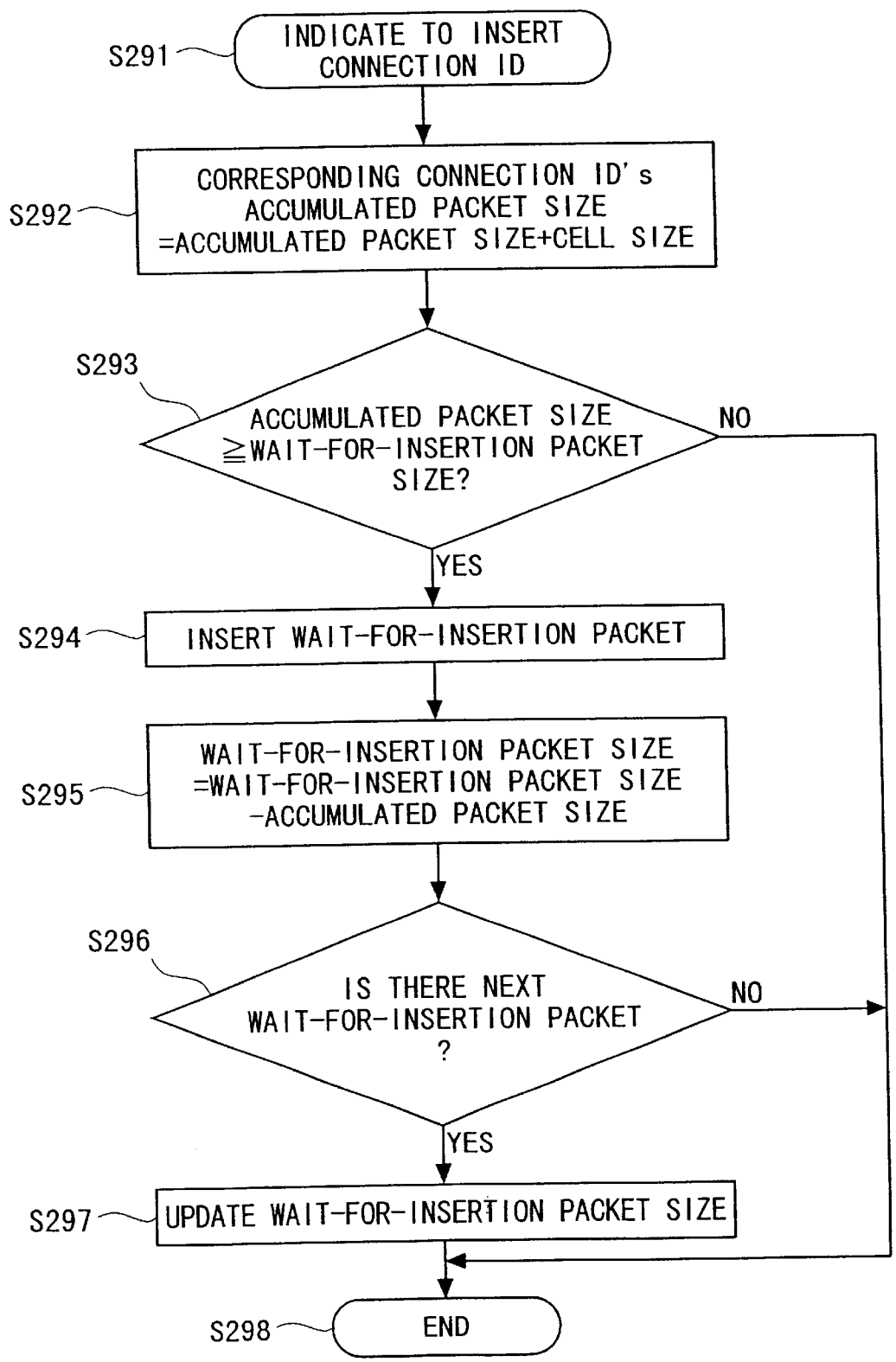
FIG. 29 is a flowchart showing an operation in the modified example of the ATM communication system of the present invention.

FIG. 28 shows a configuration of blocks of a cell inserting unit 100 in the case of accumulating the insertion packets. Further, FIG. 29 shows a judgement process executed by an insertion judging unit 110 in FIG. 28. When the cell inserting unit 100 receives a connection ID inserting indication (step S2891), the insertion judging unit 110 updates an accumulated packet size of the corresponding connection ID in an accumulated packet size table 120 (S292). Herein, the cell size is arbitrary, the number of the read-out connections ID or the connection ID inserting indications may be managed per byte, wherein 1 byte is a unit of the cell.

Next, the insertion judging unit 110 compares the accumulated packet size in the accumulated packet size table 120 with a wait-for-insertion packet size in a wait-for-insertion packet size table 130 (S293). If the accumulated packet size exceeds a wait-for-insertion packet size, a wait-for-insertion packet is inserted into a cell highway 150 from a cell buffer 140 (S294), the processing is finished with updating the wait-for-insertion packet size (S295, S296, S297, S298).

Herein, the cell packet size is updated also when coming to the packet that should be inserted next on the occasion of accumulating the insertion packets. Further, without accumulating the wait-for-insertion packets, the setting of a next insertion packet may be triggered by the packet insertion into the same connection.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A packet insertion interval control system comprising:
   a counting unit, having a first bit field for managing an insertion interval of a management packet required to be cyclically inserted and a second bit field for specifying a logic path for forwarding the management packet, for executing such a counting operation as to periodically cycle said first bit field and said second bit field; and
   a control unit for executing control for specifying, when a count value indicated by said first bit field of said counting unit is a predetermined value, the logic path for forwarding the management packet on the basis of a count value indicated by said second bit field of said counting unit, and for inserting the management packet into the specified logic path.

2. A packet insertion interval control system according to claim 1, further comprising a state-of-transmission-path management module for storing valid/invalid state data about each of the logic paths,
   wherein said control unit specifies the logic path for forwarding the management packet with reference to the valid state data of said state-of-transmission-path management module, which corresponds to the count value indicated by said second bit field of said counting unit.

3. A packet insertion interval control system comprising:
   a counting unit, having a first bit field for managing an insertion interval of a management packet required to be cyclically inserted and a second bit field for specifying a logic path for forwarding the management packet, for executing such a counting operation as to periodically cycle said first bit field and said second bit field;
   an inverting unit for obtaining an inverted value of LSB and MSB of the count value indicated by said second bit field of said counting unit; and
   a control unit for executing control for specifying, when a count value indicated by said first bit field of said counting unit is a predetermined value, the logic path for forwarding the management packet on the basis of the inverted value obtained by said inverting unit, and for inserting the management packet into the specified logic path.

4. A packet insertion interval control system according to claim 3, further comprising a state-of-transmission-path management module for storing valid/invalid state data about each of the logic paths and for managing an allocation of a serial number of the logic path to be used in order to the smaller or larger number so that the valid/invalid state data may become continuous,
   wherein said control unit specifies the logic path for forwarding the management packet with reference to the valid state data of said state-of-transmission-path management module, which corresponds to the inverted value obtained by said inverting unit.

5. A packet insertion interval control system comprising:
   a counting unit, having bit fields corresponding to the number of bits necessary for managing an insertion interval of a management packet required to be cyclically inserted and for specifying a logic path for forwarding the management packet, for executing such a counting operation as to periodically cycle said bit fields;
   an inverting unit for obtaining an inverted value of LSB and MSB of the count value indicated by said bit field of said counting unit; and
   a control unit for executing control for specifying, when the inverted value obtained by said inverting unit is equal to or smaller than a maximum value of the number of the logic paths, the logic path for forwarding the management packet on the basis of the inverted value, and for inserting the management packet into the specified logic path.

6. A packet insertion interval control system according to claim 5, further comprising a state-of-transmission-path management module for storing valid/invalid state data about each of the logic paths and for managing an allocation of a serial number of the logic path to be used in order to the smaller or larger number so that the valid/invalid state data may become continuous, wherein said control unit specifies, when the inverted value obtained by said inverting unit is equal to or smaller than a maximum value of the number of the logic paths, the logic path for forwarding the management packet with reference to the valid state data of said state-of-transmission-path management module, which corresponds to the inverted value obtained by said inverting unit.

7. A packet insertion interval control system according to claim 2, further comprising a transmission path setting management unit for managing an allocation of a serial number of the logic path to be used in order of the smaller or larger number and for, when registered or deleted in or from said state-of-transmission-path state management module, setting valid/invalid state data, with the inverted value obtained by inverting LSB and MSB of the logic path number serving as an address, wherein said control unit specifies the logic path for forwarding the management packet with reference to the valid state data of said state-of-transmission-path management module, which corresponds to the count value indicated by said second bit field of said counting unit.

8. A packet insertion interval control system comprising:

a counting unit, having bit fields corresponding to a plurality of bits, for executing such a counting operation as to periodically cycle said bit fields;

an inverting unit for obtaining an inverted value acquired by inverting LSB and MSB of a count value indicated by said bit field of said counting unit; and a control unit for executing control for specifying a logic path for forwarding a packet on the basis of the inverted value if the inverted value obtained by said inverting unit falls within a range of a predetermined threshold value as an insertion interval allocation oriented sequence value for managing an insertion interval of the packets required to be periodically inserted, and for inserting into the logic path the packets accumulated beforehand in an accumulating unit.

9. A packet insertion interval control system according to claim 8, wherein a plurality of ranges of the predetermined threshold values are set, and said control unit executes, if the inverted value falls within any one of these ranges of the predetermined threshold values, the control for specifying the logic path for forwarding the packet on the basis of the inverted value, and for inserting into the specified logic path the packets accumulated beforehand in said accumulating unit.

10. A packet insertion interval control system according to claim 8, further comprising a state-of-transmission-path management module for storing packet existing/non-existing state data of the packets in said accumulating unit, corresponding to the logic paths, wherein said control unit executes the control for specifying, when the inverted value obtained by said inverting unit falls within the range of the predetermined threshold value as the insertion interval allocation oriented sequence value for managing an insertion interval of the packets required to be periodically inserted, the logic path for forwarding the management packet on the basis of the inverted value, and for inserting into the specified logic path the packets accumulated beforehand in said accumulating unit.

11. A packet insertion interval control system comprising:

a counting unit constructed of an aggregation of counting elements each cycling with each of prime factors having, when a cyclic period is not a power of 2, the number of digits expressed by a power of a value obtained by prime-factorizing a cyclic count value; and a control unit for executing control for specifying, if an inverted value obtained by inverting a high-order digit and a low-order digit of the count value of said counting unit falls within a range of a predetermined threshold value as an insertion interval allocation oriented sequence value for managing an insertion interval of the packets required to be periodically inserted, a logic path for forwarding the packet on the basis of the inverted value, and for inserting into the specified logic path the packets accumulated beforehand in an accumulating unit.

12. A packet insertion interval control system according to claim 11, wherein a plurality of ranges of the predetermined threshold values are set, and said control unit executes, if the inverted value falls within any one of these ranges of the predetermined threshold values, the control for specifying the logic path for forwarding the packet on the basis of the inverted value, and for inserting into the specified logic path the packets accumulated beforehand in said accumulating unit.

13. A packet insertion interval control system according to claim 11, further comprising a state-of-transmission-path management module for storing packet existing/non-existing state data of the packets in said accumulating unit, corresponding to the logic paths, wherein said control unit executes the control for specifying, when the inverted value obtained by said inverting unit falls within the range of the predetermined threshold value as the insertion interval allocation oriented sequence value for managing an insertion interval of the packets required to be periodically inserted, the logic path for forwarding the management packet on the basis of the inverted value, and for inserting into the specified logic path the packets accumulated beforehand in said accumulating unit.

14. A packet insertion interval control system according to claim 2 further comprising:

a storage module for storing in-use/unused state data about each of the logic paths, corresponding to the logic path number; and a transmission path setting management unit for managing registration and deletion of the logic path number according to each of a plurality of divided groups in said storage module, and, with the smallest or largest number being always used as a new registration number, setting the serial number of the logic path for forwarding the management packet in said state-of-transmission-path management module.

15. A packet insertion interval control system according to claim 2 further comprising:

a storage module for storing in-use/unused state data about each of the logic paths, the serial numbers of the logic paths being arranged in tree according to digits when the serial numbers of the logic paths are expressed in a binary or other n-ary notation; and a transmission path setting management unit for managing registration and deletion of thelogic path number by said storage module, and, with the smallest or largest number being always used as a new registration number, setting the serial number of the logic path for forwarding the management packet in said state-of-transmission-path management module.

16. A packet insertion interval control method comprising:
a step of executing such a counting operation as to periodically cycle a first bit field for managing an insertion interval of a management packet required to be cyclically inserted and a second bit field for specifying a logic path for forwarding the management packet; and
a step of specifying, when a count value indicated by said first bit field is a predetermined value, the logic path for forwarding the management packet on the basis of a count value indicated by said second bit field, and executing control for inserting the management packet into the specified logic path.

17. A packet insertion interval control method according to claim 16, further comprising:
a step of storing valid/invalid state data about each of the logic paths in a state-of-transmission-path management module; and
a step of specifying the logic path for forwarding the management packet with reference to the valid state data of said state-of-transmission-path management module, which corresponds to the count value indicated by said second bit field.

18. A packet insertion interval control method comprising:
a step of executing such a counting operation as to periodically cycle a first bit field for managing an insertion interval of a management packet required to be cyclically inserted and a second bit field for specifying a logic path for forwarding the management packet;
a step of obtaining an inverted value of LSB and MSB of the count value indicated by said second bit; and
a step of executing control for specifying, when a count value indicated by said first bit field is a predetermined value, the logic path for forwarding the management packet on the basis of the inverted value obtained, and for inserting the management packet into the specified logic path.

19. A packet insertion interval control method according to claim 18, further comprising:
a step of storing valid/invalid state data about each of the logic paths a state-of-transmission-path management module and for managing an allocation of a serial number of the logic path to be used in order to the smaller or larger number so that the valid/invalid state data may become continuous; and
a step of specifying the logic path for forwarding the management packet with reference to the valid state data of said state-of-transmission-path management module, which corresponds to the inverted value obtained.

20. A packet insertion interval control method comprising:
a step of executing such a counting operation as to periodically cycle bit fields corresponding to the number of bits necessary for managing an insertion interval of a management packet required to be cyclically inserted and for specifying a logic path for forwarding the management packet;
a step of obtaining an inverted value of LSB and MSB of the count value indicated by said bit field; and
a step of executing control for specifying, when the inverted value obtained is equal to or smaller than a maximum value of the number of the logic paths, the logic path for forwarding the management packet on the basis of the inverted value, and for inserting the management packet into the specified logic path.

21. A packet insertion interval control method according to claim 20, further comprising:
a step of storing valid/invalid state data about each of the logic paths in a state-of-transmission-path management module and for managing an allocation of a serial number of the logic path to be used in order to the smaller or larger number so that the valid/invalid state data may become continuous; and
a step of specifying, when the inverted value is equal to or smaller than a maximum value of the number of the logic paths, the logic path for forwarding the management packet with reference to the valid state data of said state-of-transmission-path management module, which corresponds to the inverted value.

22. A packet insertion interval control method according to claim 17, further comprising:
a step of managing an allocation of a serial number of the logic path to be used in order of the smaller or larger number and of, when registered or deleted in or from said state-of-transmission-path state management module, setting valid/invalid state data, with the inverted value obtained by inverting LSB and MSB of the logic path number serving as an address; and
a step of specifying the logic path for forwarding the management packet with reference to the valid state data of said state-of-transmission-path management module, which corresponds to the count value indicated by said second bit field of said counting unit.

23. A packet insertion interval control method comprising:
a step of executing such a counting operation as to periodically cycle bit fields corresponding to a plurality of bits;
a step of obtaining an inverted value acquired by inverting LSB and MSB of a count value indicated by said bit field; and
a step of executing control for specifying a logic path for forwarding a packet on the basis of the inverted value if the inverted value obtained falls within a range of a predetermined threshold value as an insertion interval allocation oriented sequence value for managing an insertion interval of the packets required to be periodically inserted, and for inserting into the logic path the packets accumulated beforehand in an accumulating unit.

24. A packet insertion interval control method according to claim 23, further comprising:
a step of setting a plurality of ranges of the predetermined threshold values, and executing, if the inverted value falls within any one of these ranges of the predetermined threshold values, the control for specifying the logic path for forwarding the packet on the basis of the inverted value, and for inserting into the specified logic path the packets accumulated beforehand in said accumulating unit.

25. A packet insertion interval control method according to claim 23, further comprising:
a step of storing packet existing/non-existing state data of the packets in said accumulating unit in a state-of-transmission-path management module, corresponding to the logic paths; and
a step of executing the control for specifying, when the inverted value obtained falls within the range of the predetermined threshold value as the insertion interval allocation oriented sequence value for managing an insertion interval of the packets required to be periodically inserted, the logic path for forwarding the management packet on the basis of the inverted value, and for inserting into the specified logic path the packets accumulated beforehand in said accumulating unit.

26. A packet insertion interval control method comprising:

a step of configuring an aggregation of counting elements each cycling with each of prime factors having, when a cyclic period is not a power of 2, the number of digits expressed by a power of a value obtained by prime-factorizing a cyclic count value; and a step of executing control for specifying, if an inverted value obtained by inverting a high-order digit and a low-order digit of the count value of said aggregation of counting elements falls within a range of a predetermined threshold value as an insertion interval allocation oriented sequence value for managing an insertion interval of the packets required to be periodically inserted, a logic path for forwarding the packet on the basis of the inverted value, and for inserting into the specified logic path the packets accumulated beforehand in an accumulating unit.

27. A packet insertion interval control method according to claim 26, further comprising:

a step of setting a plurality of ranges of the predetermined threshold values, and executing, if the inverted value falls within any one of these ranges of the predetermined threshold values, the control for specifying the logic path for forwarding the packet on the basis of the inverted value, and for inserting into the specified logic path the packets accumulated beforehand in said accumulating unit.

28. A packet insertion interval control method according to claim, further comprising:

a step of storing packet existing/non-existing state data of the packets in said accumulating unit in a state-of-transmission-path management module, corresponding to the logic paths; and a step of executing the control for specifying, when the inverted value obtained falls within the range of the predetermined threshold value as the insertion interval allocation oriented sequence value for managing an insertion interval of the packets required to be periodically inserted, the logic path for forwarding the management packet on the basis of the inverted value, and for inserting into the specified logic path the packets accumulated beforehand in said accumulating unit.

29. A packet insertion interval control method according to claim 17, 19, 21 or 22 further comprising:

a step of storing in-use/unused state data about each of the logic paths in a storage module, corresponding to the logic path number; and a step of managing registration and deletion of the logic path number according to each of a plurality of divided groups in said storage module, and, with the smallest or largest number being always used as a new registration number, setting the serial number of the logic path for forwarding the management packet in said state-of-transmission-path management module.

30. A packet insertion interval control method according to claim 17, 19, 21 or 22 further comprising:

a step of storing in-use/unused state data about each of the logic paths;

a step of arranging the serial numbers of the logic paths in tree according to digits when the serial numbers of the logic paths are expressed in a binary or other n-ary notation;

a step of managing registration and deletion of the logic path number by said storage module, and, with the smallest or largest number being always used as a new registration number, setting the serial number of the logic path for forwarding the management packet in said state-of-transmission-path management module.

* * * * *